United States Patent [19]
Kondo

[11] Patent Number: 5,841,981
[45] Date of Patent: Nov. 24, 1998

[54] NETWORK MANAGEMENT SYSTEM DISPLAYING STATIC DEPENDENT RELATION INFORMATION

[75] Inventor: Mariko Kondo, Yokohama, Japan

[73] Assignee: Hitachi Software Engineering Co., Ltd., Kanagawa, Japan

[21] Appl. No.: 722,774

[22] Filed: Sep. 27, 1996

[30] Foreign Application Priority Data

Sep. 28, 1995 [JP] Japan .................................... 7-251065
Jun. 28, 1996 [JP] Japan .................................... 8-169834

[51] Int. Cl.⁶ ............................................... G06F 15/177
[52] U.S. Cl. ...................................................... 395/200.53
[58] Field of Search .................... 395/200.53, 200.54, 395/200.55, 200.56

[56] References Cited

U.S. PATENT DOCUMENTS

| | | | |
|---|---|---|---|
| 5,295,244 | 3/1994 | Dev et al. ........................... | 395/200.53 |
| 5,353,399 | 10/1994 | Kuwamoto et al. ................ | 395/200.54 |
| 5,394,522 | 2/1995 | Sanchez-Frank et al. ......... | 395/200.53 |
| 5,586,254 | 12/1996 | Konto et al. ....................... | 395/200.53 |
| 5,586,255 | 12/1996 | Tanaka et al. ..................... | 395/200.53 |
| 5,606,664 | 2/1997 | Brown et al. ....................... | 395/200.54 |

FOREIGN PATENT DOCUMENTS

| | | |
|---|---|---|
| 63-99654 | 4/1988 | Japan . |
| 2-98249 | 4/1990 | Japan . |
| 4-154332 | 5/1992 | Japan . |
| 5-22313 | 1/1993 | Japan . |
| 5-68038 | 3/1993 | Japan . |

*Primary Examiner*—Richard L. Ellis
*Attorney, Agent, or Firm*—Fay, Sharpe, Beall, Fagan, Minnich & McKee

[57] ABSTRACT

A network management system which is capable of visually grasping the static and dynamic dependent relation between pieces of network equipment, the direction of dependence, and the setting of the degree or frequency of dependence.

The network management system comprises a first data base where information about the physical disposition of the network equipment is stored, a second data base where information about the logical and static connection relation of the network equipment is stored, a third data base where information about the logical and dynamic connection status of the network equipment is stored, and a display unit for displaying various kinds of pieces of information about the network and a network form drawing. The network management system also comprises a first processing unit for displaying the physical disposition of the network equipment and the logical and static connection relation of the network equipment, together with the network form drawing, on the display unit, based on the information stored in the first and second data bases. The network management system further comprises a second processing unit for displaying the physical disposition of the network equipment and the logical and dynamic connection status of the network equipment, together with the network form drawing, on the display unit, based on the information stored in the first and third data bases.

8 Claims, 36 Drawing Sheets

| 3600 | 3601 | 3602 | 3603 | 3604 | 3605 | 3606 |
|---|---|---|---|---|---|---|
| SERVER INFORMATION | | | CLIENT INFORMATION | | | |
| MANAGED EQUIPMENT ID | SERVICE NAME | prtcl,daemon | MANAGED EQUIPMENT ID | prtcl,daemon | config | CONTENT |
| — | NFS | nfsd | 66102 | biod | fstab | static |
| | | | 26515 | biod | checklist | static |
| : | | | : | : | : | : |
| — | NIS | ypserv | 715455 | ypbind | resolv.conf | /1 hour |
| | | | 62858 | yppbind | brc.net | /2 hour |
| : | | | : | : | : | : |
| 192155 | NFS | nfsd | — | biod | fstab | static |
| 309871 | NFS | nfsd | — | biod | checklist | static |
| 496152 | NIS | ypserv | — | ypbind | resolv.conf | /6 hour |
| : | : | : | : | : | : | : |

360

F I G. 2
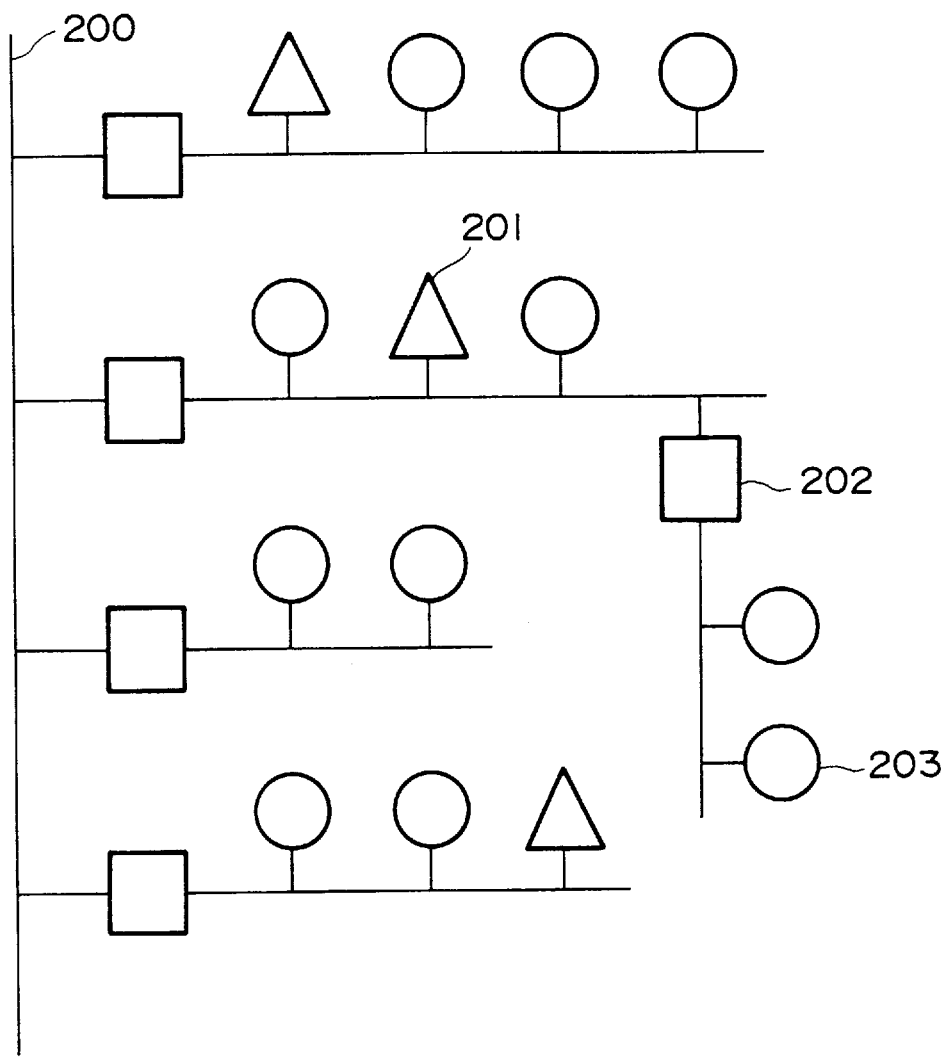

FIG. 4

| MANAGED EQUIPMENT ID 400 | CONNECTION INFORMATION 401 | CLASSIFICATION 402 | REMOTE OPERATION 403 | MACHINE NAME 404 |
|---|---|---|---|---|
| 00101 | 20114 | ELECTRONIC COMPUTER | REMOTE SHELL SNMP | taro |
| 31923 | 132888 | CABLE | UNUSABLE | jiro |
| 82615 | 55709 03248 | NETWORK CONNECTION EQUIPMENT | telnet SNMP | saburo |
| ..... | ..... | ..... | ..... | ..... |

| CLASSIFI-CATION | SERVICE NAME | prtcl, daemon | PARTI-TION | config | |
|---|---|---|---|---|---|
| ELECTRONIC COMPUTER | NETWORK INFORMATION SERVICE (NIS) | ypserv | S | nis.conf | 610 |
| | | ypbind | C | resolv.conf | |
| | ROUTING | rip, routed | — | geteways | 611 |
| | NETWORK FILE SYSTEM (NFS) | nfsd | S | exports | 612 |
| | | biod | C | fstab | |
| | NETWORK MANAGEMENT (SNMP) | snmp, trap | S | snmpd.conf | 613 |
| | MAIL | pop | S | inetd.conf | |
| | | smtp(sendmail) | — | sendmail.cf | |
| | NEWS | nntp | S | inetd.conf | |
| | DOMAIN NAME SERVICE (DNS) | named | S | named.boot | |
| | | domain | C | resolv.conf | |
| | TIME SYNCHRONIZATION | timed | S | — | |
| | | ntp | C | ntp.conf | |
| | FILE TRANSMISSION | ftpd, tftpd | S | services | |
| | | ftp, tftp | C | — | |
| | ⋮ | ⋮ | ⋮ | ⋮ | |
| NETWORK CONNECTION EQUIPMENT | FILE TRANSMISSION | ftpd, tftpd | S | services | |
| | | ftp, tftp | C | — | |
| | REMOTE ACCESS | telnetd | S | services | |
| | | telnet | C | — | |
| | ROUTING | rip, routed | — | services | |
| | ⋮ | ⋮ | ⋮ | ⋮ | |
| ⋮ | ⋮ | ⋮ | ⋮ | ⋮ | |

| MANAGED EQUIPMENT ID (700) | START FILE NAME (701) |
|---|---|
| 00102 | rc |
| | rc. custom |
| | rc. net |
| | rc. local |
| | inetd. conf |
| | ⋮ |
| 24615 | brc |
| | rc |
| | netlinkrc |
| | netnfsrc |
| | netnmrc |
| | netbsdsrc |
| | resolv. conf |
| | ntp. conf |
| | ⋮ |
| ⋮ | ⋮ |

```
domainname $DOMAINNAME
case "$NIS" in
server--m.server)
    if [-f/usr/etc/ypserv-a-d/etc/yp/$DOMAINNAME]; then
        /usr/etc/ypserv
    fi
    if [-f/etc/ypbind]; then
        /etc/ypbind
    fi
client)
    if [-f/etc/ypbind]; then
        /etc/ypbind
    fi
    ;;
esac
```  ⎬ 800

```
elif ["$ROUTER"=routed-a-f/etc/routed]; then
    /etc/routed
        route add default $ROUTER I
fi
```  ⎬ 801

```
mount-vat nfs if [-f/usr/etc/exportfs-a-f/etc/exports]; then
    /usr/etc/exportfs-av
fi if [-f/etc/nfsd-a-f/etc/exports]; then
    /etc/nfsd 8 &
fi if [-f/etc/biod]; then
    /etc/biod 8
fi
```  ⎬ 802

```
if [-f/etc/snmpd-a-f/etc/snmpd.conf]; then
    /etc/snmpd
fi
```  ⎬ 803

| PROCESS ID (900) | USER NAME (901) | CPU TIME (902) | PROCESS STATE (903) | COMMAND (904) | |
|---|---|---|---|---|---|
| 308 | root | 1:17 | SLEEP | ypbind | ~910 |
| 159 | root | 2:12 | STANDBY | routed | ~911 |
| 4173 | root | 5:48 | SLEEP | nfsd | ~912 |
| 846 | root | 0:08 | SWAP OUT | snmpd | ~913 |
| : | : | : | : | : | |
| 12211 | taro | 2:11 | EXECUTABLE | ps | |
| : | : | : | : | : | |

| RECEIVER ID 1000 | SENDER ID 1001 | PACKET LENGTH 1002 | COMMUNICATION PROTOCOL 1003 | COLLECTING TIME 1004 |
|---|---|---|---|---|
| 11021 | 24176 | 80 | snmp | 1995/01/10 14:32:56 |
| 26359 | 86773 | 620 | ftp | 1995/01/10 15:05:31 |
| .. | .. | .. | .. | .. |

99

F I G. 13

| SERVICE NAME | DISPLAY COLOR | LINE FONT | ACCESS FREQUENCY | DISPLAY ORDER |
|---|---|---|---|---|
| NFS | yellow | dot | ~10 (NUMBER OF CLIENTS) | 1 |
| | | | ~25 | 2 |
| | | | ⋮ | ⋮ |
| | | | 100~ | 10 |
| NIS | red | dash-dot | ~0.25 (FREQUENCY/HOUR) | 1 |
| | | | ~1 | 2 |
| | | | ⋮ | ⋮ |
| ⋮ | ⋮ | ⋮ | ⋮ | ⋮ |

| SERVER INFORMATION | | CLIENT INFORMATION | | | |
|---|---|---|---|---|---|
| SERVICE NAME | prtcl, daemon | prtcl, daemon | config | MANAGED EQUIPMENT ID | CONTENT |
| NFS | nfsd | biod | fstab | 103342 | static |
|  |  |  | checklist | 77059 | static |
| NIS | ypserv | ypbind | resolv.conf | 103343 | /1 hour |
|  |  |  | brc.net | 62858 | /2 hour |
| .. | .. | .. | .. | .. | .. |

1300 1301 1302 1303 1304 1305

130

| SERVER INFORMATION | | | CLIENT INFORMATION | | | |
|---|---|---|---|---|---|---|
| SERVICE NAME | prtcl, daemon | PROCESS ID | prtcl, daemon | PROCESS ID | config | MANAGED EQUIPMENT ID | CONTENT |
| NFS | nfsd | 1256 | biod | 5301 | fstab | 10342 | static |
|  |  |  |  | 4099 | checklist | 77059 | static |
|  |  |  |  | .. | .. | .. | .. |
| NIS | ypserv | 2268 | ypbind | 5394 | resolv.conf | 10343 | /1hour |
|  |  |  |  | 138 | brc.net | 62858 | /2hour |
|  |  |  |  | .. | .. | .. | .. |
| .. | .. | .. | .. | .. | .. | .. | .. |

| MANAGED EQUIPMENT ID | WIRELESS COMMUNICATION TYPE | COMMUNICABLE EQUIPMENT ID | REMOTE CONTROL | MACHINE NAME |
|---|---|---|---|---|
| 17823 | RADIO WAVE | 10342, 34635, 2324 | USABLE | EWL1 |
| 93672 | LIGHT | 66378, 98783 | USABLE | FWL5 |
| 453364 | INFRARED RAY | 45325, 74634 | UNUSABLE | RWL0 |
| 34535 | LASER BEAM | 24643, 90031 | UNUSABLE | LWL3 |
| .. | .. | .. | .. | .. |

FIG. 33

| MANAGED EQUIPMENT ID | CONNECTING MEDIUM | CONNECTING METHOD | SERVICE NAME | CLIENT ID | CONNECTION START TIME |
|---|---|---|---|---|---|
| 78123 | PUBLIC LINE | DIAL UP | e-mail | 127.1.1.1 | 95.12.17 09:30 |
| 69372 | PRIVATE LINE | PPP | telnet | 256.2.2.2 | 95.12.17 10:01 |
| 94564 | INS64 | SLIP | ftp | 512.3.3.3 | 95.12.17 08:54 |
| .. | .. | .. | .. | .. | .. |

| MANAGED EQUIPMENT ID | SERVER INFORMATION | | CLIENT INFORMATION | | | |
|---|---|---|---|---|---|---|
| | SERVICE NAME | prtcl, daemon | MANAGED EQUIPMENT ID | prtcl, daemon | config | CONTENT |
| 192155 | NFS | nfsd | 66102 | biod | fstab | static |
| | | | 26515 | biod | checklist | static |
| | | | .. | .. | .. | .. |
| | NIS | ypserv | 715455 | ypbind | resolv.conf | /1 hour |
| | | | 62858 | yppbind | brc.net | /2 hour |
| | | | .. | .. | .. | .. |
| 309871 | NFS | nfsd | — | biod | fstab | static |
| | NFS | nfsd | — | biod | checklist | static |
| 496152 | NIS | ypserv | — | ypbind | resolv.conf | /6 hour |
| .. | .. | .. | .. | .. | .. | .. |

360

NETWORK MANAGEMENT SYSTEM DISPLAYING STATIC DEPENDENT RELATION INFORMATION

BACKGROUND OF THE INVENTION

The present invention relates to computer networks where a plurality of computers and a plurality of pieces of network equipment are interconnected, and more particularly to a network management system used for smoothly operating and managing networks.

Means, such as a means of collecting MIB (management information base) information of network equipment stored on a network using simple network management protocol (SNMP), a means of graphically displaying the collected MIB information, a means of storing log files, statistical processing means, and a means of generating reports, have hitherto been realized in conventional network management systems for smooth operation and management of networks.

In addition, with the object of enhancing network efficiency, a variety of network traffic monitor units have been provided.

Furthermore, there are known the following systems and methods which aim at operating and managing networks.

(1) "Local Network Analyzer" in Japanese Patent Application Laid-Open No. 63-99654

(2) "Method and System for Controlling Network Topography" in Japanese Patent Application Laid-Open No. 02-98249

(3) "LAN Configuration Support System" in Japanese Patent Application Laid-Open No. 04-154332

(4) "System and Method for Collecting LAN Statistical Data" in Japanese Patent Application Laid-Open No. 05-68038

(5) "System for Monitoring Terminals of a Local Network" in Japanese Patent Application Laid-Open No. 05-22313

The local network analyzer of the aforementioned (1) analyzes the load factor of a local area network and the relation between the packet spacing or packet length and the number of packets and makes it possible to easily grasp the duty factor.

The method and system for controlling network topography of the aforementioned (2) exchanges connection information between adjacent local stations and determines the validity or invalidity of the connection regarding network topography by using a list of valid connections.

The LAN configuration support system of the aforementioned (3) draws a LAN configuration drawing on a graphic display, virtually adds connection predicting equipment, and displays the operational status of the LAN based on virtual operational data.

The system and method for collecting LAN statistical data of the aforementioned (4) receives packets traveling on a LAN, analyzes the load factor on the LAN and the relation between the number of packets, packet spacing, and packet length, and displays the line duty factor and load state of the LAN with real time.

The system for monitoring terminals of a local network of the aforementioned (5) confirms the state of a terminal at fixed intervals and judges the state (stop, start, and operation) of the terminal.

The aforementioned disclosures have the following problems.

In the system which collects and analyzes MIB information using SNMP, the original information of the individual pieces of network equipment can be obtained but the information about the relation between pieces of network equipment is not stored in the MIB Information. Therefore, the static dependent relation between pieces of network equipment, the direction of dependence, and the setting of the degree or frequency of dependence cannot be grasped.

In the network traffic monitor unit, the local network analyzer of (1), and the system for collecting LAN statistical data of (4) disclosures there can be taken out senders, receivers, and protocols at units of information called packets which flow on a network, however, even if the information monitored for a certain period of time were displayed as statistical information, there would be the problem that the dynamic dependence status at a certain point of time between pieces of network equipment, the direction of dependence, and the degree or frequency of dependence cannot be grasped.

Furthermore, the analysis of statistical information, which is performed by the conventional network management system or the network traffic monitor unit described in the aforementioned disclosures, is limited to a network which is an object of management, so it cannot be grasped whether at a certain point of time the managed equipment within a network which is an object of management is responding as a server on the request for communication service from a machine connected to another global network other than the object of management.

The method and system for controlling network topography of (2) can recognize the connection validity of network topology from the connection information with another piece of equipment. However, since this system recognizes connection validity only, there is the problem that the critical point of a network which is an object of management cannot be grasped or the traffic tendency cannot be predicted.

The LAN configuration support system of (3) predicts the operational status of a LAN after it is introduced in connection prediction equipment. However, there is the problem that the operational status of the LAN being actually operated cannot be grasped or information for judging the necessity of load dispersion cannot be obtained.

The system for monitoring terminals of a local network of (5) can discriminate the state of a terminal at intervals of fixed time. However, there is the problem that the operational status or load concentration tendency of the entire network which is an object of management cannot be grasped or indexes for taking a measure to disperse the load on the network or make traffic uniform cannot be indicated.

Furthermore, the aforementioned systems are not provided with a means of displaying the static dependent relation between pieces of equipment which perform wireless communication using infrared rays or radio waves, the direction of dependence, and the degree or frequency of dependence, and consequently, these cannot be visually grasped.

Moreover, display means is not provided also for the dynamic dependent status at a certain point of time between pieces of equipment performing wireless communication, the direction of dependence, and the degree of dependence, so these cannot be visually grasped.

SUMMARY OF THE INVENTION

A first objective of the present invention is to provide a network management system which is capable of visually grasping the static dependent relation between pieces of network equipment, the direction of dependence, and the setting of the degree or frequency of dependence, in a computer network where a plurality of computers and a plurality of pieces of network equipment are interconnected.

A second objective of the present invention is to provide a network management system which is capable of grasping the critical point of a network which is an object of management and predicting traffic tendency.

A third objective of the present invention is to provide a network management system which is capable of visually grasping the dynamic dependent relation at a certain point of time between pieces of network equipment, the direction of dependence, and the degree or frequency of dependence.

A fourth objective of the present invention is to provide a network management system which is capable of grasping the operational status or load concentration tendency of the entire network which is an object of management and indicating indexes for taking a measurement to disperse load on the network and to make traffic uniform.

A fifth objective of the present invention is to provide a network management system with the functions described in the first through the fourth objectives which is also capable of managing networks connected by a wireless communication method which uses infrared rays or radio waves without connecting networks through cable wiring.

A sixth objective of the present invention is to provide a network management system which is capable of grasping the dynamic dependence status at a certain point of time between pieces of equipment provided in a network which is outside an object of management and a network which is an object of management.

Simply explained, the outline of some of the inventions described in this application is as follows.

1. A network management system is provided for managing and operating a network where a plurality of pieces of network equipment including computers are interconnected. The network management system comprises a first data base where information about a physical disposition of the network equipment is stored, a second data base where information about a logical and static connection relation of the network equipment is stored, a display unit for displaying various kinds of pieces of information about the network and a network form drawing, and first processing means for displaying the physical disposition of the network equipment and the logical and static connection relation of the network equipment, together with the network form drawing, on the display unit, based on the information stored in the first and second data bases.

The aforementioned first processing means is provided with means which integrates a plurality of pieces of information about the logical and static connection relations of all pieces of network equipment on the network form drawing displayed on the display unit and displays on the display unit a mutual dependent relation between pieces of network equipment on the network and a degree of importance of each piece of network equipment to the network.

2. In addition, the network management system according to the present invention comprises a first data base where information about a physical disposition of the network equipment is stored, a third data base where information about a logical and dynamic connection status of the network equipment is stored, a display unit for displaying various kinds of pieces of information about the network and a network form drawing, and second processing means for displaying the physical disposition of the network equipment and the logical and dynamic connection status of the network equipment, together with the network form drawing, on the display unit, based on the information stored in the first and third data bases.

The aforementioned second processing means is provided with means which integrates a plurality of pieces of information about the logical and static connection relations of all pieces of network equipment on the network form drawing displayed on the display unit and displays on the display unit a mutual dependent relation between pieces of network equipment on the network and a degree of importance of each piece of network equipment to the network.

In accordance with the aforementioned means, the information about the logical and static connection relation of the network equipment on the network is displayed on the network form drawing for smooth operation and management of the network. Therefore, the static dependent relation between pieces of network equipment, the direction of dependence, and the setting of the degree or frequency of dependence can be visually grasped.

Also, in accordance with the aforementioned means, a plurality of pieces of information about the logical and static connection relation of the network equipment on the network are integrated and the degree of importance of each piece of network equipment to the network is displayed on the network form drawing. Therefore, the critical point of a network which is an object of management can be grasped and traffic tendency can be predicted.

In addition, in accordance with the aforementioned means, the information about the logical and dynamic connection status of the network equipment on the network is displayed on the network form drawing. Therefore, the dynamic dependent relation at a certain point of time between pieces of network equipment, the direction of dependence, and the degree or frequency of dependence can be visually grasped.

Furthermore, in accordance with the aforementioned means, a plurality of pieces of information about the logical and dynamic connection status of the network equipment on the network are integrated, and the degree of importance of each piece of network equipment to the network at a certain point of time and the mutual dependent status between pieces of equipment are displayed on the network form drawing. Therefore, the operational status or load concentration tendency of the entire network which is an object of management can be grasped. Furthermore, indexes for taking a measurement to disperse load on the network and to make traffic uniform can be indicated.

BRIEF DESCRIPTION OF THE DRAWINGS

The present invention will be described in further detail with reference to the accompanying drawings, in which

FIG. 2 is a diagram used for explaining the logical network form of this embodiment;

FIG. 4 is a diagram showing the configuration of a data base of this embodiment, the data base including information about a managed equipment ID, Information about a connection, information about classification, information about remote control, and information about a machine name;

FIG. 6 is a diagram showing the configuration of a data base of this embodiment where service names that are used in a network environment have been registered;

FIG. 7 shows the configuration of a start file name data base of this embodiment where a list of start file names is stored, the files being executed when managed equipment is started;

FIG. 8 is a diagram showing an example of the described content of the start file of the managed equipment of this embodiment;

FIG. 9 is a diagram showing the configuration of a process table of this embodiment which stores the information about the state of a process being currently executed by managed equipment;

FIG. 10 is a diagram showing the configuration of a traffic data base of this embodiment where the information of the header portion of the packet flowing on a network is collected as traffic data;

FIG. 13 is a diagram showing the configuration of the display data base of the network form drawing of this embodiment;

FIG. 16 is a diagram showing the configuration of a static client list a of this embodiment;

FIG. 28 is a diagram showing an example of the data of a wireless communication equipment data base;

FIG. 33 is a diagram showing an example of the data of a global network status data base

FIG. 36 is a diagram showing a display example of the detail information about the static connection relation regarding managed equipment of this embodiment.

DESCRIPTION OF THE PREFERRED EMBODIMENTS

Figure 1:
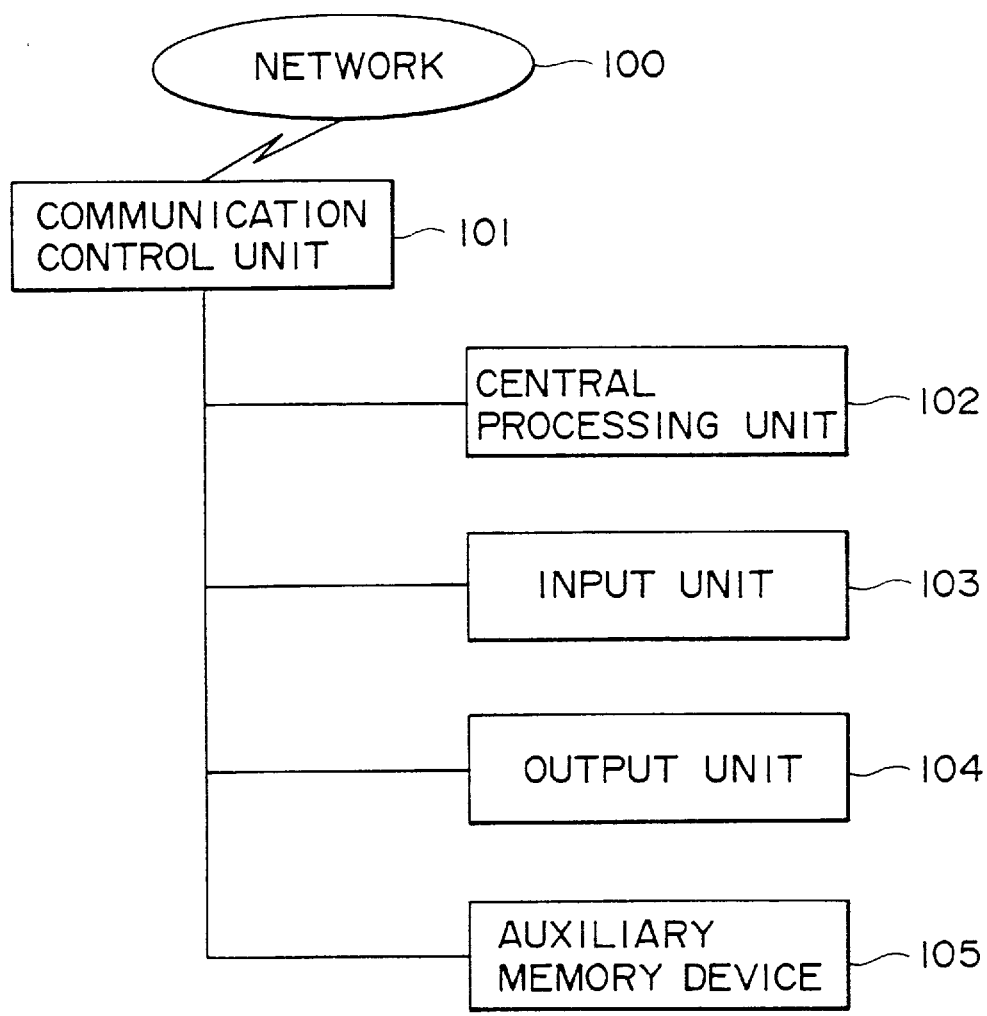
FIG. 1 is a block diagram showing the hardware structure of a network management system according to an embodiment of the present invention.

FIG. 1 is a block diagram which shows the hardware structure of a network management system according to an embodiment of the present invention.

The network management system of the embodiment, as shown in FIG. 1, is constituted by network 100 where a plurality of pieces of network equipment managed by the network management system are interconnected through cables, a communication control unit 101 which controls communications between the network management system and the network 100, a central processing unit 102 which performs data processing, system control, and various preprogrammed kinds of processing, an input unit 103 which includes a key board and a mouse, an output unit 104 which includes a display and a printer, and an auxiliary memory device 105 such as a magneto-optical disk, metal tape, or a hard disk.

In the network 100 communications are performed among a plurality of pieces of network equipment being connected.

The network equipment which the network management system here considers to be an object of management is referred to as managed equipment. The managed equipment includes the following.

(1) Computers such as workstations, personal computers, host computers, and file servers.

(2) Terminals such as X terminals, character terminals, and graphic terminals.

(3) Network connection devices such as routers, repeaters, terminal servers, transceivers, bridges, hubs, protocol converters, and modems.

(4) Peripheral equipment such as, printers, word processors, facsimiles, and scanners.

(5) Cables such as internet cables, telephone lines, and power cables.

(6) Installations such as air-conditioning installations, and drawings such as floor layouts and building maps.

Furthermore, the network management system of this embodiment handles, as management attributes, the software environment and the machine environment as to managed equipment, system configuration, and network form.

A description will hereinafter be made of the terms handled in this embodiment and the network form.

The network form represents how computers, terminals, network equipment, peripheral equipment, and cables are interconnected.

The network form, which represents connection status including an actual positional relation of connection and actual distance, is referred to as the physical network form.

The network form which represents connection status by logical units such as sub-nets and segments is referred to as the logical network form.

A concrete example of the logical network form is shown in FIG. 2.

In the figure, reference numeral 200 denotes a communication network, reference numeral 201 a computer, reference numeral 202 network equipment, and reference numeral 203 a terminal The network form drawing employed in this embodiment will next be described.

The network form drawing is a drawing which integrates the aforementioned physical network form and the aforementioned logical network form. In the network form drawing, a plurality of pieces of equipment, managed by the network management system, are disposed on a map, a building drawing, and a floor drawing on a certain reduced scale, and at the same time, the physical connection status is expressed in correspondence with actual distance and area, including Installation status of cables, power disposition, and telephone disposition.

The network form drawing was obtained by retrieving, in accordance with a position desired to be shown, a range, equipment to be managed, and purposes, necessary information from among the physical network form, the logical network form, the network wiring, the floor drawing, the map, the statistical information about network traffic, and the duty factor of a network line, stored in the data base of the auxiliary memory device 105 shown in FIG. 1, and then integrating the retrieved plurality of pieces of information. The obtained network form drawing is displayed on the output unit 104 shown in FIG. 1.

Figure 3:
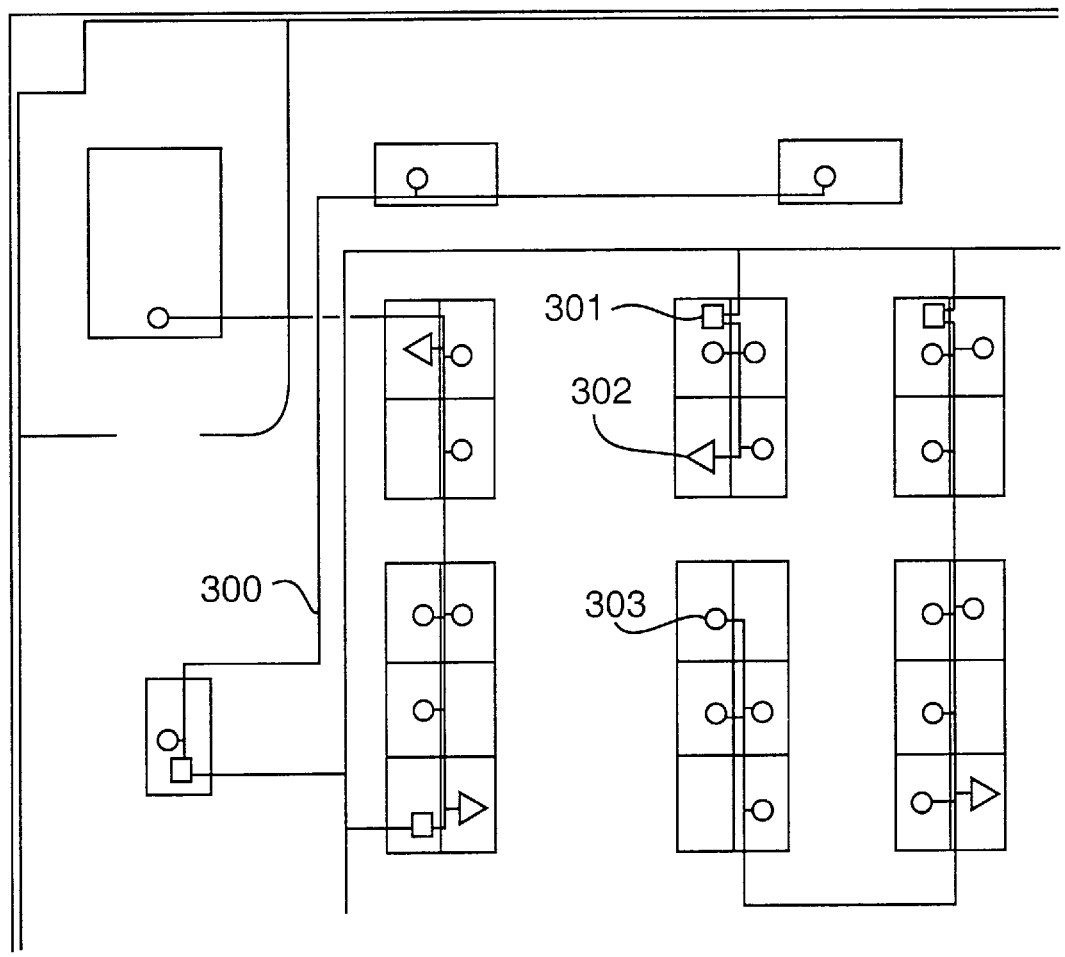
FIG. 3 is a diagram showing a display example of the network form drawing of this embodiment displayed on a display unit.

A concrete example of the network form drawing of this embodiment is shown in FIG. 3.

In the figure, reference numeral 300 denotes a communication network, reference numeral 301 network equipment, reference numeral 302 a computer, and reference numeral 303 a terminal.

The network management system of this embodiment, in addition to the aforementioned data base where a plurality of pieces of information about management attributes are stored, has an additional data base mentioned below.

FIG. 4 shows the form of data base 40 where each information about managed equipment is stored.

The data base 40 stores information about managed equipment ID 400, connection information 401, classification information 402, remote control information 403, and machine name information 404.

The managed equipment ID 400 represents an identification number which can exclusively determine managed equipment. This managed equipment ID 400 is allocated to the managed equipment's graphic data of the network form drawing that is displayed by the network management system. Therefore, with the managed equipment ID 400, the graphic data of the managed equipment on the network form can be retrieved and the position on the network form drawing can be specified.

The connection information 401 represents the managed equipment ID of managed equipment being directly and physically connected.

The classification 402 is used for identifying computers, terminals, network equipment, peripheral equipment, or cables.

The remote control 403 is an item for determining whether managed equipment can be controlled remotely.

The machine name 404 is the name on the network of managed equipment.

The remote control used herein means a function of executing an instruction sent from another computer connected to the network and sending back the result.

The network management system of this embodiment can collect information from a remote controllable computer and a terminal connected to the network by making use of the aforementioned remote control function.

In the remote control 403 shown in FIG. 4, the kind of usable remote control is stored for each piece of managed equipment, but, when managed equipment cannot be controlled remotely, the term unusable is stored.

Figure 5:
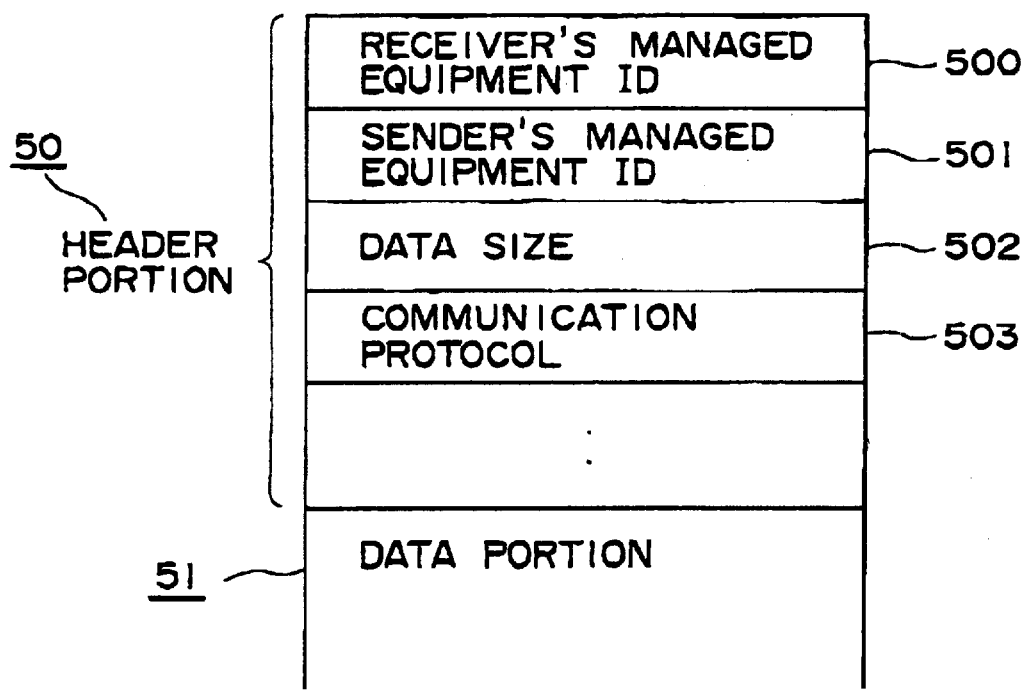
FIG. 5 is a diagram used for explaining the configuration of the header portion of a packet of this embodiment.

FIG. 5 shows the configuration of a packet (communication data are broken down into small "packets" for transmission), which is an information unit of communications being performed between pieces of managed equipment on the network.

The packet is segmented Into two portions a header portion 50 storing control information necessary for transmission or reception and a data portion 51 storing information which is actually transmitted or received.

The header portion 50 stores various kinds of pieces of control information. The header information in this embodiment, as shown in FIG. 5, is constituted by a managed equipment ID 500 of a receiver, a managed equipment ID 501 of a sender, data size (number of data bytes) 502, communication protocol 503, etc.

FIG. 6 shows the configuration of the data base 60 where a list of the service names that a plurality of pieces of managed equipment use in the network environment has been registered. A plurality of pieces of information, stored in the data base 60, have been preregistered by the users of the network management system who are network managers.

The data bass 60 of the service names shown in FIG. 6, as with the classification 402 of FIG. 4, stores classifications 600 which identify computers, terminals, network equipment, peripheral equipment, or cables. The data base 60 also stores service name 601 which are the name of services that the managed equipment corresponding to the classifications 600 use in the network environment. In addition, the data base 60 stores protocols or demons 602, which are the software protocols (communication protocols) that are employed when the service names 601 are used in the managed equipment corresponding to the classifications 600, or the process (demons) that have been normally started in order to use services on the managed equipment.

Furthermore, the data base 60 stores partitions 603, which are information to identify whether the protocols or demons 602 are operated as a sides (S: server) which supply services or as sides (C: client) which request service. Moreover, the data base 60 stores information about configurations 604 which are file names for configuring the protocols or demons 602 to the managed equipment.

The communication protocol that is stored in the protocol or demon 602 is the same information as the communication protocol 503 that is stored in the header portion 50 of FIG. 5.

When the protocol or demon 602 is neither a server nor a client, the partition 603 is expressed as "—(not corresponding)" on the data base 60.

If the protocol or demon 602 is on the server side, then set information about a frequency of services and a right to access will be described in the configuration file which is stored in the aforementioned configuration 604. If, on the other hand, the protocol or demon 602 is on the client side, set information about the managed equipment ID of the equipment which becomes a server of the service and set information about access frequency will be described in the configuration file.

Reference numerals 610 through 613, shown in FIG. 6, denote concrete examples of the services, respectively.

The network information service (NIS) 610 shares within the network the information about the machine name or user's account name connected to the network and performs one-way management. Note that the side which provides information is called a server and the side which requests information is called a client.

For example, when a client requests Information about a network being managed in one direction, the client sends a request to the server in accordance with the communication protocol and receives the information.

Routing operation 611 controls the route of packets flowing on networks. The routing operation 611 is started by an computer or network connection equipment, which becomes a boundary between networks, that is, has been connected to two or more networks. The routing operation 611 determines to which network a packet is sent in accordance with the receiver's managed equipment ID 500 constituting the header portion 50 shown in FIG. 5.

For the network file system (NFS) 612, the hard disks which are held by the computers connected to the network are shared between the computers within the network.

The existence of the file sharing can be set to the hard disk for each file system. As with the network information service 610, the side which provides a file system is called a server and the side which requests a file system is called a client.

When a client has access to a file system which another computer (server) holds, the client sends a request in accordance with communication protocol.

If allowance of share to the client side has been set on the server side, access to the file system of another computer which is a server will become possible.

The network management (SNMP) 613 has access to the original network management information that the computer or the network connection equipment being connected to the network holds in the interior.

The side which accesses information, that is, the equipment which performs network management is called the manager and the equipment which has information is called the agent.

The manager, in correspondence with the object of the management and when necessary, can take out the information that the agent holds in accordance with communication protocol.

FIG. 7 shows the configuration of data base 70 where a list of start file names held by managed equipment, and the files are executed when the managed equipment is started.

As shown in FIG. 7, the data base 70, as with the managed equipment ID 400 of FIG. 4, stores information about a managed equipment ID 700 which can exclusively determine managed equipment and information about a start file name 701 which is the name of a file that is executed when the equipment of the managed equipment ID 700 is started.

The information stored in the data base 70 can also be registered in advance by the users of the network management system who are network managers. Alternatively, the information can also be generated by inquiring a start file name to managed equipment by using the managed equipment ID through the network management system and then collecting the information.

FIG. 8 shows the described content of a start file 80 with a certain start file name 701 of the equipment of a certain managed equipment ID 700 of FIG. 7 as an example of a start file.

The start information of equipment described in the start file 80 has been registered beforehand in the equipment itself. Also, there are cases where the information has been registered or changed by the users of the network management system who are network managers.

In FIG. 8 reference numeral 800 is a set example of the network information service (NIS) 610 of FIG. 6, reference numeral 801 is a set example of the routing operation 611 of FIG. 6, reference numeral 802 is a set example of the network file system (NFS) 612 of FIG. 6, and reference numeral 803 is a set example of the network management (SNMP) 613 of FIG. 6.

As shown in FIG. 8, various kinds of pieces of network service start information are set to the start file of each piece of managed equipment. Also, the managed-equipment configuration content as to network service is stored in the file stored in the configuration 604 of FIG. 6.

Therefore, from the file name which is stored in the data base 70 of FIG. 7 and executed when each piece of managed equipment is started, the various kinds of pieces of network service start information described in the respective start files, and the set information described in each configuration file about each network service, it can be recognized how one piece of managed equipment and another piece of managed equipment are related when the other piece of managed equipment is started.

The aforementioned relation between pieces of equipment is referred to as a static connection relation.

However, the start information set in the start file, that is, the static connection relation is sometimes changed dynamically by the input of a command after starting of each piece of managed equipment.

That is, the static connection relation at the time of start does not always continue eternally, and there is the possibility that the relation between a plurality of pieces of managed equipment being connected on the network will vary with time.

Therefore, in order to manage the state of the network during operation, there is the need for investigating the relation between pieces of managed equipment at a certain point of time. In this embodiment, such a relation between pieces of managed equipment at a certain point of time is referred to as a dynamic connection status and handled in distinction from the static connection relation.

The investigation of the dynamic connection status is performed by using a process table 90 shown in FIG. 9 and traffic data 99 shown in FIG. 10, which are described later.

FIG. 9 shows the configuration of process table 90 which stores the information about a process being currently executed that managed equipment Itself holds in the interior.

In the process table 90 shown in FIG. 9, a process ID 900 represents a number which can exclusively determine a process being-executed by managed equipment and a user's name 901 the name of a user who starts the process. CPU time 902 represents CPU time during which the process is used. Process state 903 represents the current process state of the process and Command 904 a command being currently executed.

In addition, reference numerals 910 through 913 shown in FIG. 9 represent the process states of commands started by the start information described in the start file shown in FIG. 8.

In the process table 90 shown in FIG. 9 reference numeral 910 represents an example of the process state of the network information service (NIS) 800 of FIG. 8, reference numeral 911 an example of the process state of the routing operation 801 of FIG. 8, reference numeral 912 an example of the process state of the network file system (NFS) of FIG. 8, and reference numeral 913 an example of the process state of the network management (SNMP) 803 of FIG. 8.

The network management system of this embodiment, by making use of the data processing function and the system control function which the central processing unit 102 of FIG. 1 has beforehand, can collect the process table 90 held by managed equipment through a network communication portion 1014 shown in FIG. 11 described later, from the managed equipment where the remote control 403 has become possible in the managed equipment data base 40 shown in FIG. 4.

FIG. 10 shows the configuration of a traffic data base 99 where the information of the header portion 50 of the packet of FIG. 5 flowing on a network is collected and stored as traffic data.

In the traffic data base 99 shown in FIG. 10, reference numeral 1000 represents a receiver's managed equipment ID of a packet, reference numeral 1001 a sender's managed equipment ID, reference numeral 1002 a packet length (byte number), reference numeral 1003 communication protocol, and reference numeral 1004 packet collecting time.

Figure 11:
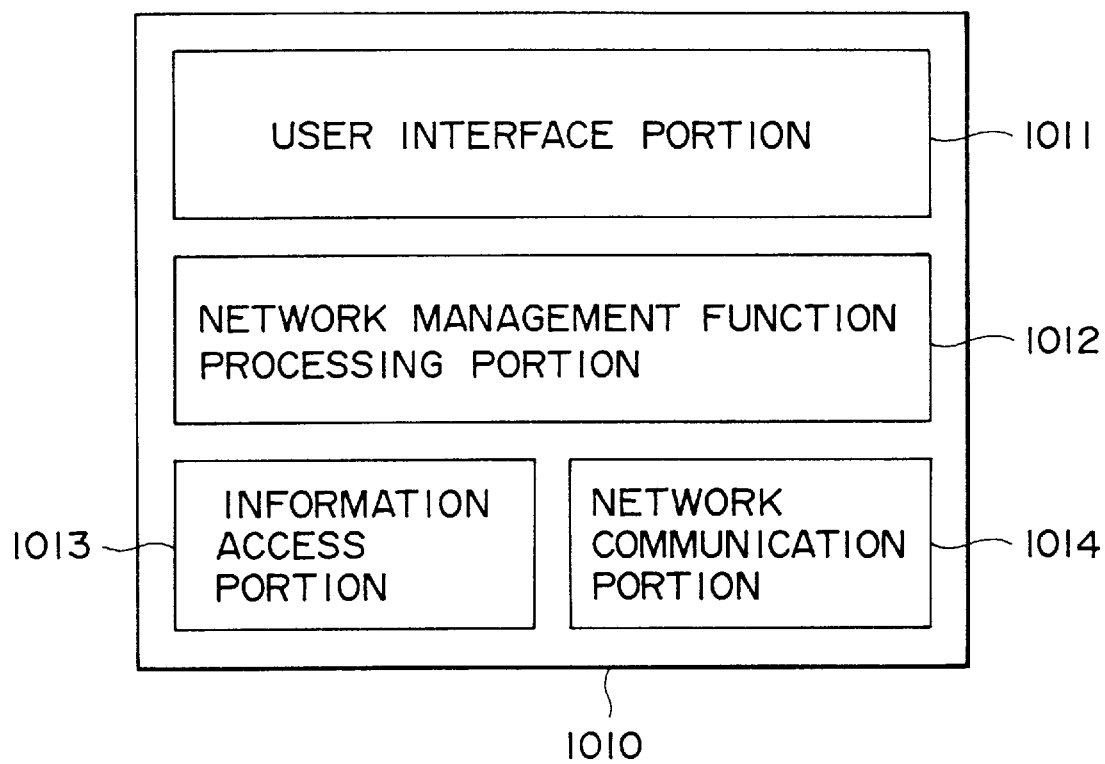
FIG. 11 is a block diagram showing the hardware structure of a network management system according to an embodiment of the present invention.

FIG. 11 shows the system configuration of the network management system of this embodiment. Reference numeral 1010 shown in FIG. 11 denotes a processing section which moves on the central processing unit 102 shown in FIG. 1 to perform network management.

The processing section 1010 is constituted by a user's interface portion 1011, a network management function processing portion 1012, an information access portion 1013, and a network communication portion 1014.

The user's interface portion 1011 shown in FIG. 11, in the network management system, controls the information that is output from the input unit 103 shown in FIG. 1 or the information that is input to the output unit 104.

The network management function processing portion 1012 transmits or receives information to or from the user's interface portion 1011, the information access portion 1013, and the network communication portion 1014 to perform a process of visually showing the static or dynamic dependent relation between pieces of network equipment, the direction of dependence, and the degree or frequency of dependence.

The information access portion 1013 accesses the physical network form, the logical network form, the network wiring, floor drawing, the map, the network traffic statistical information, or the network line duty factor, which have been stored in the auxiliary memory device 104 shown in FIG. 1. The information access portion 1013 also accesses the managed equipment data base 40 shown in FIG. 4, the service name data base 60 shown in FIG. 6, the start film name data base 70 shown in FIG. 7, the process table 90 shown in FIG. 9, and the traffic data base 99 shown in FIG. 10.

The network communication portion 1014 performs the communication with the network 100 through the communication control unit 101 shown in FIG. 1.

Next, what service a certain computer (which is a piece of managed equipment) requests of another piece of managed equipment, that is, the process of specifying a piece of managed equipment which is the client of certain service, detecting the static connection relation between the client and the server about the service, and displaying the detected result onto the network form drawing shown in FIG. 3, will be described along a flowchart of FIG. 12 by using the managed equipment data base 40 of FIG. 4, the service name data base 60 of FIG. 6, and the start file name data base 70 of FIG. 7.

Figure 12:
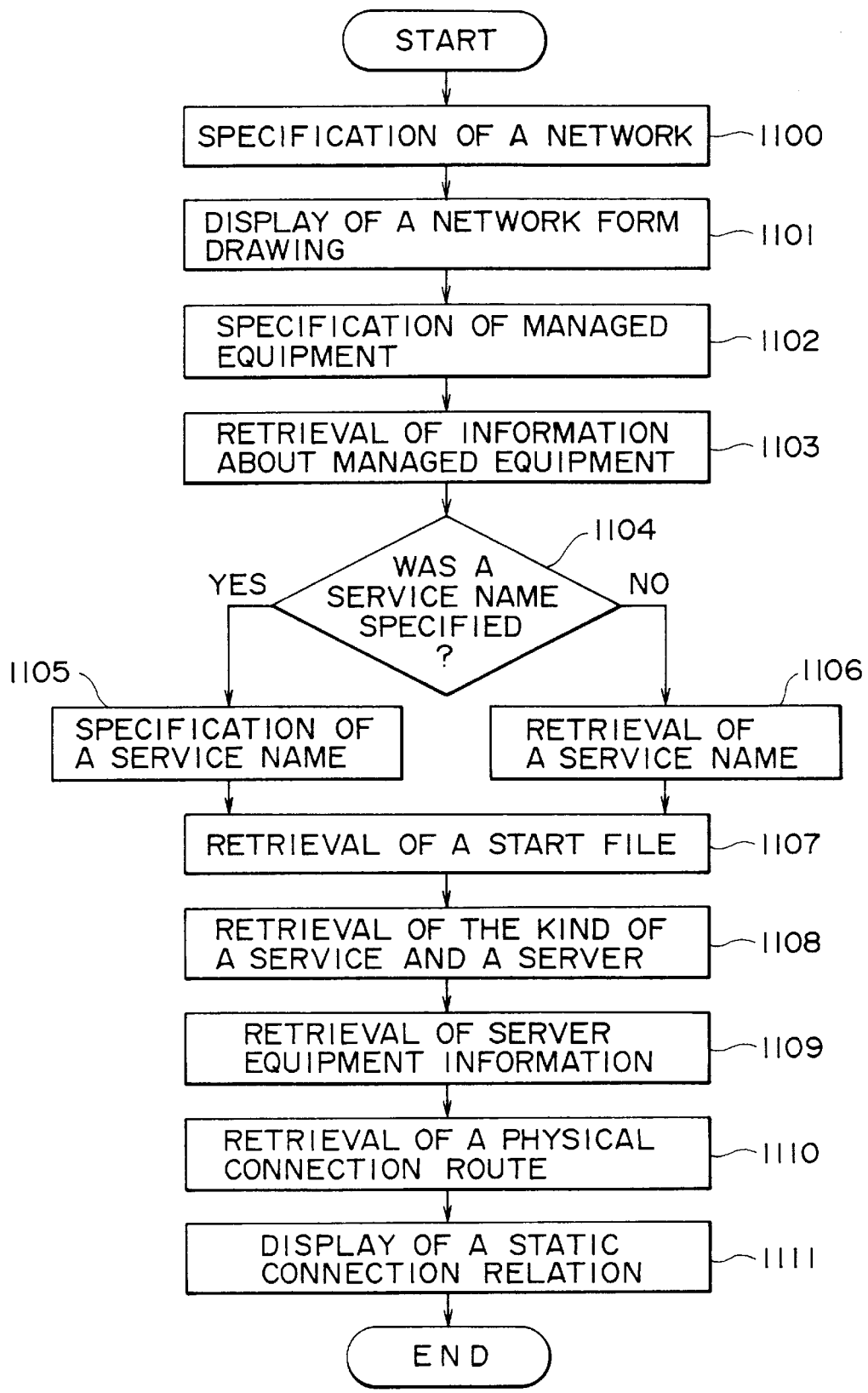
FIG. 12 is a flowchart showing the processing procedure of this embodiment of specifying managed equipment which is a client, detecting the static connection relation between the client and a server, and displaying the result.

In the process of displaying the detected result onto the network form drawing of this embodiment, as shown in FIG. 12, a network which detects and displays a static connection relation is specified with the input unit by the user of the network management system (step 1100), and the network management system displays the network form drawing of the specified network on the output unit (step 1101).

The managed equipment (client), which detects and displays a static connection relation, is specified on the network form drawing with the input unit by the user of the network management system (step 1102). The network management system retrieves the information about the specified managed equipment from the managed equipment data base 40 of FIG. 4 (step 1103). The existence of the specification of a service name which is retrieved is inquired to the user of the network management system (step 1104).

When, in step 1104, the user specifies a service name, step 1104 advances to step 1105. When, on the other hand, all service names are retrieved, step 1104 advances to step 1106.

In step 1105 a service name which is retrieved is specified by the user of the network management system.

In step 1106 the service name and the configuration file name, which are used under network environment by the managed equipment (as a client), are retrieved from the service name data base 60 of FIG. 6 by using the classification information which is contained in the information about the managed equipment retrieved in step 1103. Note that the managed equipment where the partition has not been defined in the service name data base 60 will be handled as a client.

Thereafter, the start file that the managed equipment uses when it is started is retrieved from the start file name data base 70 of FIG. 7 by using the managed equipment ID which is contained in the information about the managed equipment retrieved in step 1103 (step 1107).

The kind of a service set as a client, the managed equipment ID and machine name of equipment which becomes a server, and furthermore the access frequency corresponding to the kind of the service are retrieved from the start file and configuration file of the managed equipment by using either the service name specified by the user in step 1105 or the service name retrieved in step 1106 that the managed equipment uses under network environment and also by using the start file retrieved in step 1107 that the managed equipment uses when it is started and furthermore the configuration file name of the managed equipment (step 1108).

The information about equipment which becomes a server and the figure on the corresponding network form drawing are retrieved from the managed equipment data base 40 of FIG. 4 by using the managed equipment ID and machine name of the equipment retrieved in step 1108 which becomes a server (step 1109).

The managed equipment constituting the physical connection route (connection between equipment and a cable) between pieces of managed equipment and the information about the managed equipment are retrieved from the managed equipment data base 40 of FIG. 4 by using the connection information stored in the managed equipment data base of the server retrieved in step 1109 and the connection information about the managed equipment which is the client specified in step 1102 (step 1110).

The static connection relation of the managed equipment specified in step 1102 is displayed in recognizable form on the network form drawing displayed in step 1101 by using the kind of the service or the access frequency retrieved in step 1108, the figure of the server retrieved in step 1109, and the information about the managed equipment constituting the physical connection route retrieved in step 1110 (step 1111).

When the aforementioned display is performed, the network management system determines the colors of display of services which are displayed, the line fonts, and the order of displays by referring to the display data base 1120 of FIG. 13 that has been held beforehand.

In the display data base 1120 shown in FIG. 13, reference numeral 1121 represents a service name 601 similar to the service name stored in the service name data base 60 of FIG. 6, reference numeral 1122 the display color of the service, reference numeral 1123 the line font of the service, reference numeral 1124 the access frequency of the service, and reference numeral 1125 the display order corresponding to the access frequency 1124 of the service. The display order 1125 is also used when the managed equipment which has become a server is displayed.

Figure 14:
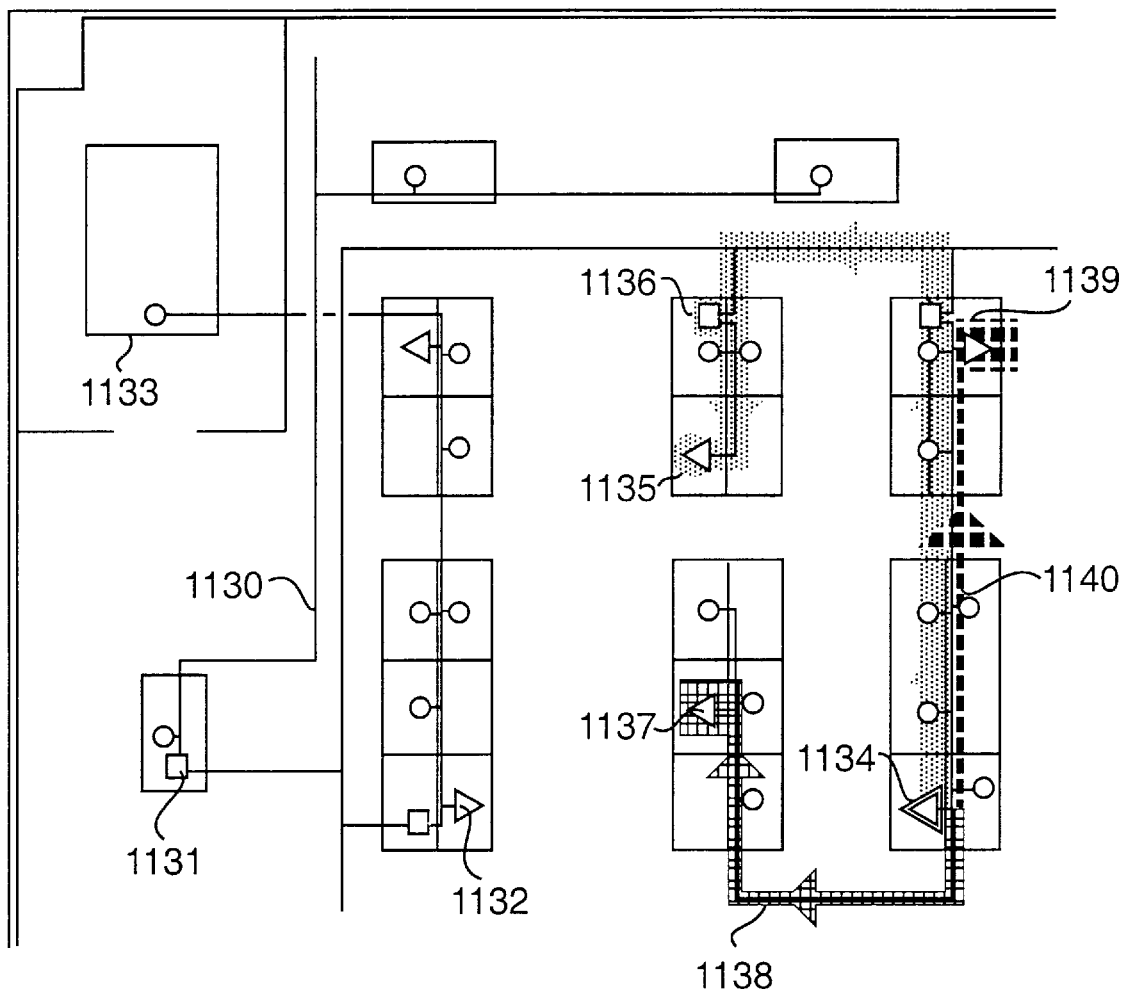
FIG. 14 is a diagram showing a display example of the result of the static connection relation between a server and a client of this embodiment detected in the case where the managed equipment which is the client is specified and the service name is not specified.

An example of the display form in step 1111 in the case where a service name was not specified in step 1105 is shown in FIG. 14.

In the figure, reference numeral 1130 represents a communication network, reference numeral 1131 network equipment, reference numeral 1132 an computer, reference numeral 1133 a terminal, and reference numeral 1134 the managed equipment which is the client specified in step 1102.

In this embodiment, there is shown the display example in the case service A, service B, and service C were detected in the retrieval of service names of step 1106.

In FIG. 14 reference numeral 1135 denotes the managed equipment which is the server of the service A retrieved in step 1109 and reference numeral 1136 the managed equipment which constitutes the physical connection route between pieces of managed equipment of the service A retrieved in step 1110.

In addition, reference numeral 1137 denotes the managed equipment which is the server of the service B retrieved In step 1109 and reference numeral 1138 the managed equipment which constitutes the physical connection route between pieces of managed equipment of the service B retrieved in step 1110.

Furthermore, reference numeral 1139 denotes the managed equipment which is the server of the service C retrieved in step 1109 and reference numeral 1140 the managed equipment which constitutes the physical connection route between pieces of managed equipment of the service C retrieved in step 1110.

Figure 15:
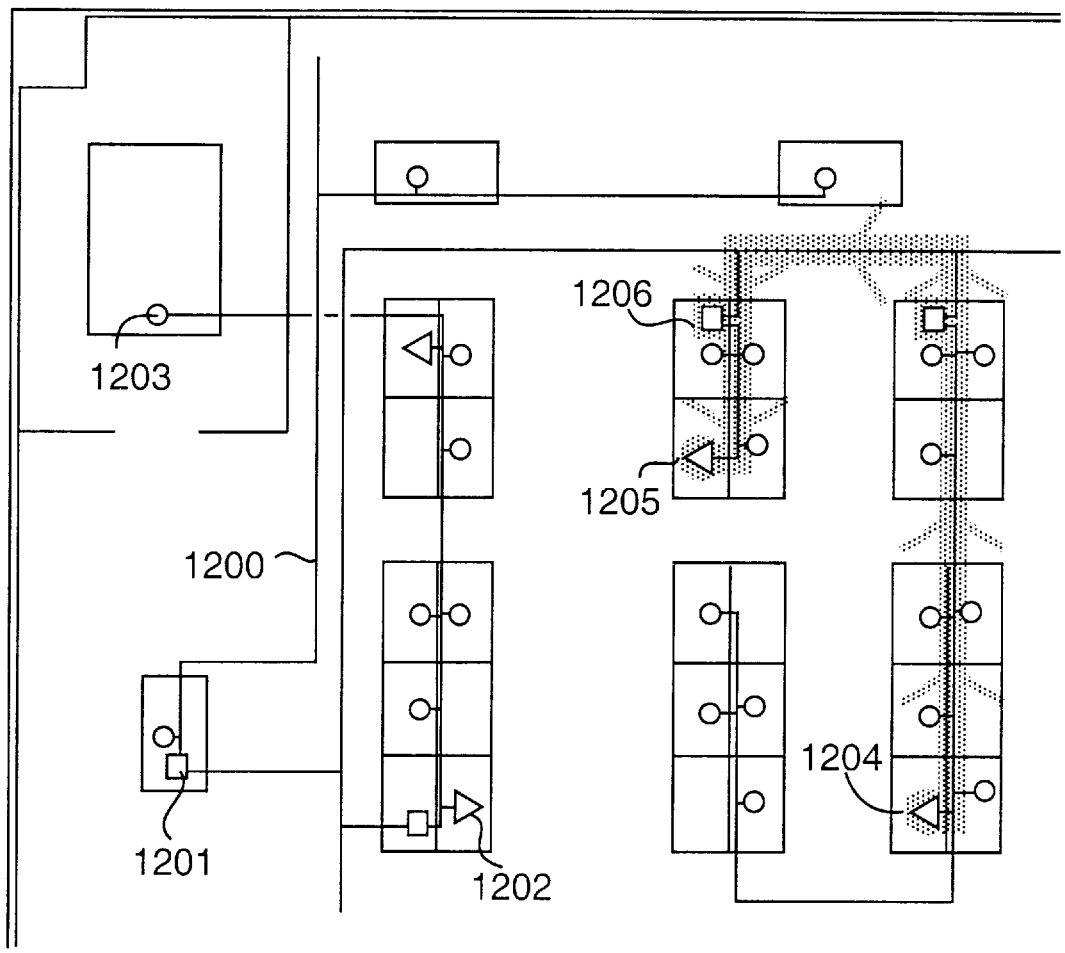
FIG. 15 is a diagram showing a display example of the result of the static connection relation between a server and a client of this embodiment detected in the case where the managed equipment which is the client is specified.

Next, an example of the display form of step 1111 in the case where a service name was specified in step 1105 is shown in FIG. 15.

In the figure, reference numeral 1200 represents a communication network, reference numeral 1201 network equipment, reference numeral 1202 an computer, and reference numeral 1203 a terminal. Reference numeral 1204 represents the managed equipment which is the client of a certain service specified in step 1102, reference numeral 1205 represents the managed equipment which is the server of the service specified in step 1109, and reference numeral 1206 represents the managed equipment which constitutes the physical connection route between both pieces of equipment retrieved in step 1110.

Furthermore, the network management system, if either the managed equipment 1204 which is a client displayed as in FIG. 15 or the managed equipment 1205 which is a server is specified with the input unit by the user, will display the detail information about the static connection relation regarding the managed equipment.

If the specified managed equipment is a client, the managed equipment ID 400, classification 402, and machine name 404 of FIG. 4, the service name 601 and the protocol or demon 602 on the client side of FIG. 6, and the managed equipment ID, machine name, and access frequency of the equipment which becomes the server retrieved in step 1108 of a flowchart of FIG. 12 will be displayed as detail information.

When, on the other hand, the specified managed equipment is a server, the managed equipment ID 400, classification 402, and machine name 404 of FIG. 4, the service name 601 and the protocol or demon 602 on the server side of FIG. 6, and the access frequency retrieved in step 1108 of a flowchart of FIG. 12 are displayed as detail information.

The display of the static connection relation is not limited to the form shown in FIG. 14 or FIG. 15 but the form of display can be changed by arbitrary changing the display color 1122, line font 1123, access frequency 1124, and display order 1125 of the display data base 1120 shown in FIG. 13 by the user.

Taking FIG. 13 as an example, the display order can be changed according to the access frequency of the service A and displayed with thicker lines.

Next, what service a certain computer (which is a piece of managed equipment) supplies to another piece of managed equipment, that is, the process of specifying a piece of managed equipment which is the client of certain service, detecting the static connection relation between the server and the client about the service, and displaying the detected result onto the network form drawing shown in FIG. 3, will be described along a flowchart of FIG. 17 by using the managed equipment data base 40 of FIG. 4, the service name data base 60 of FIG. 6, the start file name data base 70 of FIG. 7, and the static client list of FIG. 16.

With respect to the services that are used under network environment, FIG. 16 shows the configuration of the list where services which are supplied to servers and the clients of the services are listed. In this embodiment, this list is referred to as a static client list.

Figure 17:
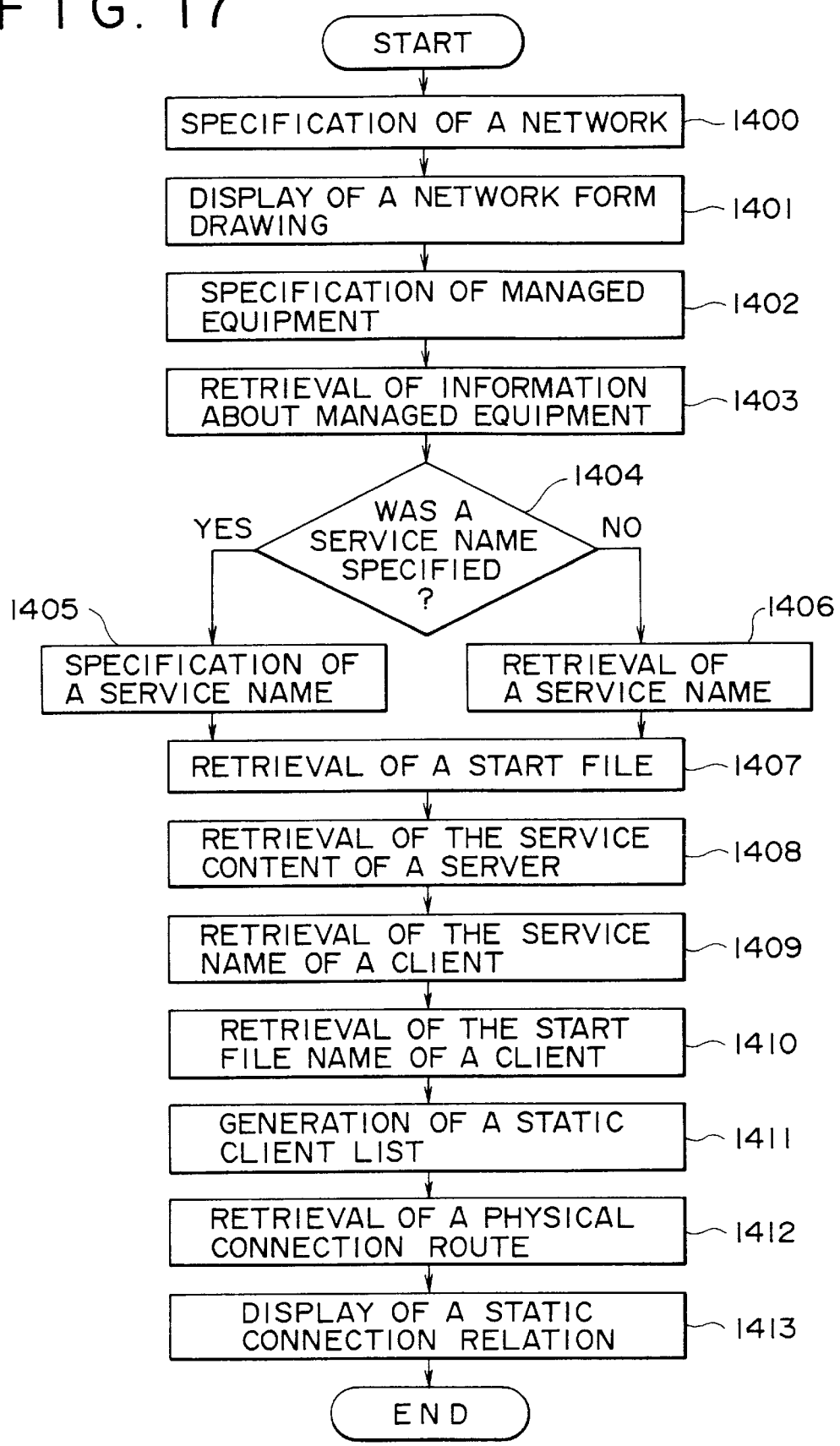
FIG. 17 is a flowchart showing the processing procedure of this embodiment of specifying managed equipment which is a server, detecting the static connection relation between the server and a client, and displaying the result.

The static client list 130 shown in FIG. 16 is generated as a file by the network management system during the processing procedure described in the flowchart of this embodiment shown in FIG. 17.

Reference numerals 1300 through 1301, shown in FIG. 16, denote pieces of information on the server side and reference numerals 1302 through 1305 denote pieces of information on the client side.

In FIG. 16 reference numeral 1300 represents the service name which is supplied by a server and reference numeral 1301 represents the protocol or demon which is starting on the server side which corresponds to the service name 1300. Reference numeral 1302 represents the protocol or demon which is starting on the client side which corresponds to the service name 1300. Reference numeral 1303 represents the service configuration file name which has been set on the client side. Reference numeral 1304 represents the identification number of managed equipment which has become a client. Reference numeral 1305 represents the set content, for example, the access frequency of the service described in the configuration file 1303 on the side of a client 1304.

In the process of displaying the static connection relation onto the network form drawing, as shown in FIG. 17, the network which detects and displays the static connection relation is first specified with the input unit by the user of the network management system (step 1400).

The network form drawing of the network specified by the network management system is displayed on the output unit (step 1401).

The managed equipment, (server) which detects and displays a static connection relation, is specified on the network form drawing with the input unit by the user of the network management system (step 1402).

The network management system retrieves the information about the specified managed equipment from the managed equipment data base 40 (step 1403).

The existence of the specification of a service name which is retrieved is inquired to the user of the network management system (step 1404).

When, in step 1404, the user specifies a service name, step 1404 advances to step 1405. When, on the other hand, all service names are retrieved, step 1404 advances to step 1406.

In step 1405 a service name which is retrieved is specified by the user of the network management system.

In step 1406 the service names, which are used under network environment by the managed equipment (as a client), are all retrieved from the service name data base 60 of FIG. 6 by using the classification information which is contained in the information about the managed equipment retrieved in step 1403.

The start file that the managed equipment uses when it is started is retrieved from the start file name data base 70 of FIG. 7 by using the managed equipment ID which is contained in the information about the managed equipment retrieved in step 1403 (step 1407).

The kind of a service set as a server and the service frequency corresponding to the kind of the service are retrieved from the start file of the managed equipment and the configuration file of the service by using either the service name specified by the user in step 1405 or the service name retrieved in step 1406 that the managed equipment uses under network environment and also by using the start file retrieved in step 1407 that the managed equipment uses when it is started. Then, the result of retrieval is written in the server information section of the static client list 130 in FIG. 16 (step 1408).

Here, when the user specifies a single service name in step 1405, the service name 1300 and the protocol or demon 1301 of the static client list 130 of FIG. 16 become only a single item, respectively.

Thereafter, with the service name of the service which has been set as a server in the managed equipment retrieved in step 1408, the service name and the configuration file name on the corresponding client side are retrieved from the service name data base 60 of FIG. 6 (step 1409).

With respect to all pieces of managed equipment other than the managed equipment (server) specified in step 1402, start file names are retrieved from the start file name data base 70 shown in FIG. 7 by referring to the managed equipment data base 40 shown in FIG. 4 (step 1410).

The service, where the managed equipment specified in step 1402 has been set as a server, is retrieved within each start file and configuration file by using the service name on the client side retrieved in step 1409 and the start file name retrieved in step 1410. The result is written to the client information portion of the static client list shown in FIG. 16 (step 1411).

Then, the server specified in step 1402, the managed equipment which constitutes the physical connection route (connection between equipment and a cable) between clients of a certain service written to the static client list in step 1411, and the Information about the managed equipment are retrieved from the managed equipment data base 40 of FIG. 4 by using the connection information of each piece of managed equipment stored in the managed equipment data base 40 (step 1412).

The static connection relation of the managed equipment (server) specified in step 1402 is displayed in recognizable form on the network form drawing displayed in step 1401 by using the static client list generated in step 1411 and the information about the managed equipment constituting the physical connection route retrieved in step 1412 (step 1413).

Figure 18:
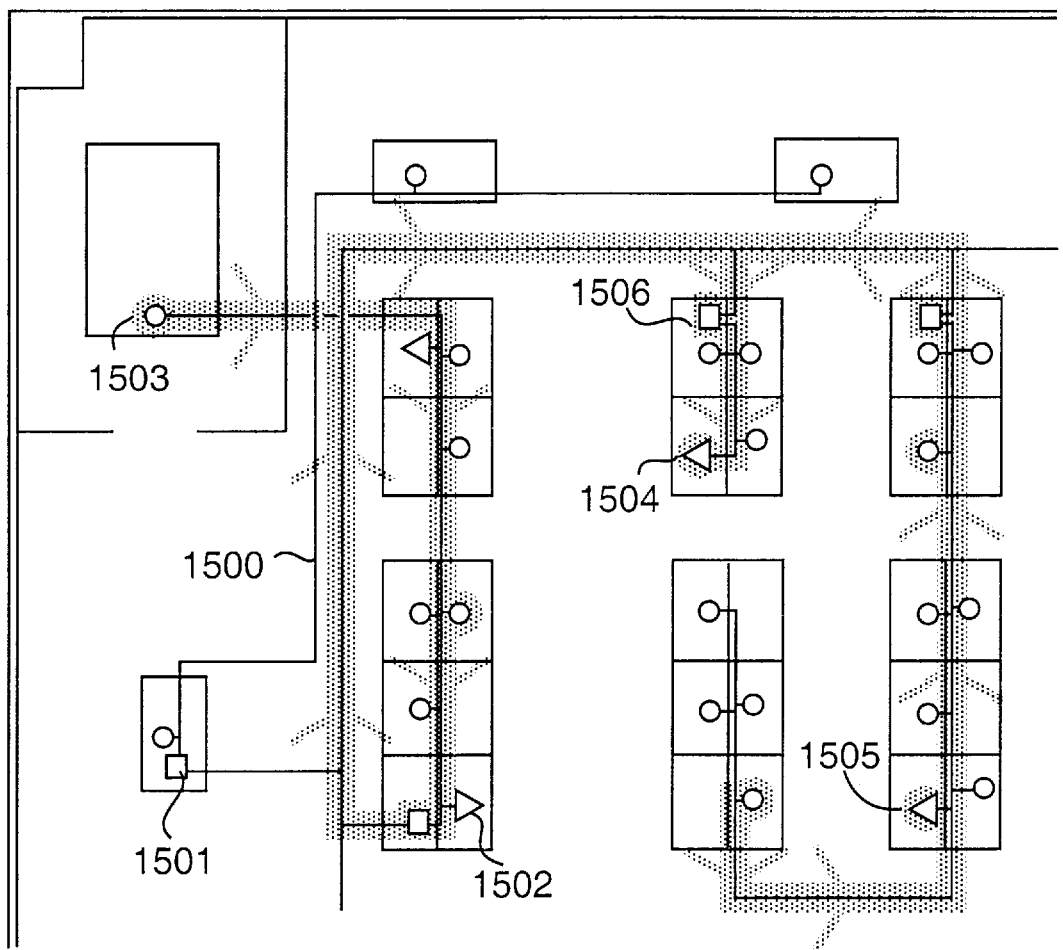
FIG. 18 is a diagram showing a display example of the result of the static connection relation between a server and a client of this embodiment detected in the case where the managed equipment which is the server is specified.

An example of the display form in step 1411 in the case where a service name was specified in step 1404 is shown in FIG. 18.

Reference numeral 1500, shown in FIG. 18, represents a communication network, reference numeral 1501 network equipment, reference numeral 1502 an computer, reference numeral 1503 a terminal, reference numeral 1504 the managed equipment which is the server of the service specified in step 1402, and reference numeral 1505 the managed equipment which is the client of the service retrieved in step 1411. Reference numeral 1506 the represents managed equipment which constitutes the physical connection route between both pieces of equipment retrieved in step 1412.

Furthermore, the network management system, if either the managed equipment 1504 which is a client displayed as in FIG. 18 or the managed equipment 1505 which is a server is specified with the input unit by the user, will display the detail information about the static connection relation regarding the managed equipment.

If the specified managed equipment is a server, the static client list (130 of FIG. 16) generated in step 1411 of a flowchart of FIG. 17 will be displayed as detail information.

When, on the other hand, the specified managed equipment is a client, a managed equipment ID corresponding to the managed equipment ID of the specified client equipment is extracted from the static client list (130 of FIG. 16) generated in step 1411 of a flowchart of FIG. 17, and the extracted result is displayed as detail information.

The display of the static connection relation is not limited to the form shown in FIG. 18 but the form of display can be changed by arbitrary changing the display color 1122, line font 1123, access frequency 1124, and display order 1125 of the display data base 1120 shown in FIG. 13 by the user.

When a great number of clients that are accessed exist, it is possible to make the display form of the managed equipment 1504 larger which is a server or make the display form of the managed equipment 1506 thicker which constitutes a physical connection route. Also, when the display of the static connection relations regarding a plurality of services is performed, it is also possible to change a color of display in correspondence with the kind of the service.

Next, the process of detecting the static connection relation over the entirety of a certain network managed by the network manager and displaying the detected result onto the network form drawing shown in FIG. 3 will be described along a flowchart of FIG. 19 by using the managed equipment data base 40 of FIG. 4, the service name data base 60 of FIG. 6, the start file name data base 70 of FIG. 7, and the static client list 130 of FIG. 16.

Figure 19:
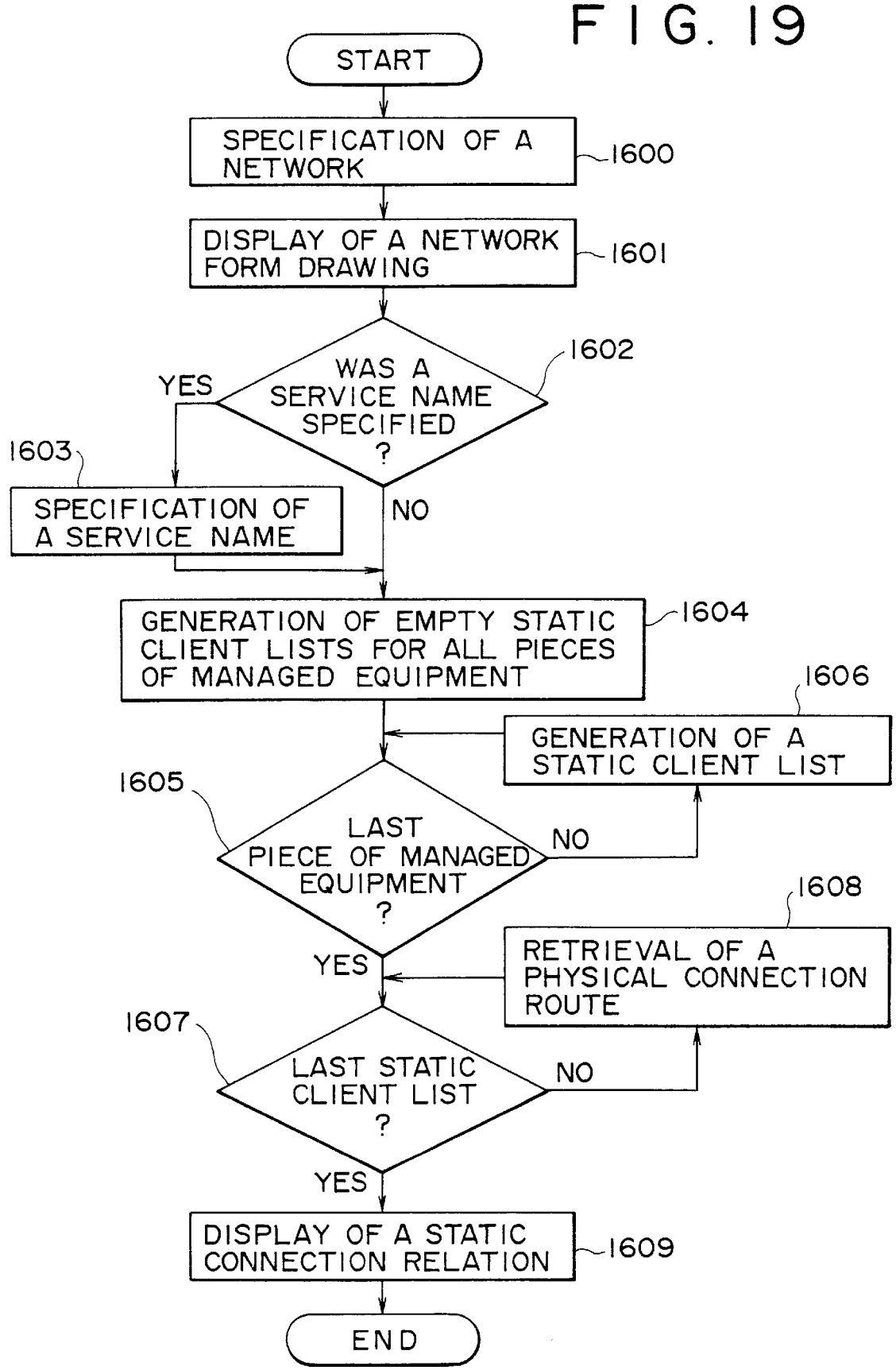
FIG. 19 is a flowchart showing the processing procedure of this embodiment of detecting the static connection relation between a server and a client of the entire network and displaying the result.

In the process of displaying the aforementioned static connection relation onto the network form drawing, as shown in FIG. 19, the network which detects and displays the static connection relation is first specified with the input unit by the user of the network management system (step 1600).

The network management system displays the specified network form drawing on the output unit (step 1601).

The existence of the specification of a service name which is retrieved is inquired to the user of the network management system (step 1602).

When, in step 1602, the user specifies a service name, step 1602 advances to step 1603. When, on the other hand, the user does not specify a service name, all service names are retrieved and step 1602 advances to step 1604.

In step 1603 a service name which is retrieved is specified by the user of the network management system.

In step 1604 an empty static client list is generated for all pieces of managed equipment stored in the managed equipment data base 40 of FIG. 4.

Thereafter, the first piece of managed equipment is retrieved from the managed equipment data base 40 and the retrieving is repeated through step 1606 until the last piece of managed equipment is retrieved (step 1605).

The managed equipment, retrieved in step 1605, is grasped as a client, and in FIG. 12 which is a flowchart of a static connection relation display process of specifying a client to detect a server, the same steps as steps 1107 through 1109 are performed in order to retrieve service where the managed equipment has become a client and also retrieve the server of the service. The retrieved result is written to the client information portion of the static client list of the managed equipment which has become the server.

Furthermore, the managed equipment, retrieved in step 1605, is grasped as a server, and in FIG. 17 which is a flowchart of a static connection relation display process of specifying a sever to detect a client, the same steps as steps 1407 through 1411 are performed in order to retrieve service where the managed equipment has become a server and also retrieve the client of the service. The retrieved result is written to the server information portion of the static client list of the managed equipment (step 1606).

If step 1606 ends, the network management system moves an object of retrieval to the next item of the managed equipment data base 40 and repeats steps 1605 through 1606 until the last piece of managed equipment of the managed equipment data base.

Step 1605 will advance to step 1607 if the aforementioned steps come to the end of the managed equipment data base 40.

Then, from the first piece of managed equipment of the managed equipment data base 40 of FIG. 4 to the last piece of managed equipment, the processing in step 1608 is performed with respect to the static client list of each piece of managed equipment to which the retrieved result in step 1606 was added (step 1407).

The static client list of each piece of managed equipment to which the retrieved result in step 1606 was added is retrieved, and for a client which is not empty, the physical connection route between managed equipment which has become a server and managed equipment which has become a client is retrieved in the same way as step 1412 in FIG. 17 which is a flowchart of a process of specifying a server to detect a client (step 1408).

If step 1608 ends, the network management system moves an object of retrieval to the next item of the managed equipment data base 40 and repeats steps 1607 and 1608 until the last piece of managed equipment of the managed equipment data base. If, in step 1607, the last of the managed equipment data base 40 is processed, that is, if the last static client list is processed, step 1607 will advance to step 1609.

The static connection relation of the entire network is displayed in recognizable form on the network form drawing displayed in step 1601 by using the static client list of each piece of managed equipment generated in step 1606 and the physical connection route between a server and a client retrieved in step 1608 (step 1609).

Figure 20:
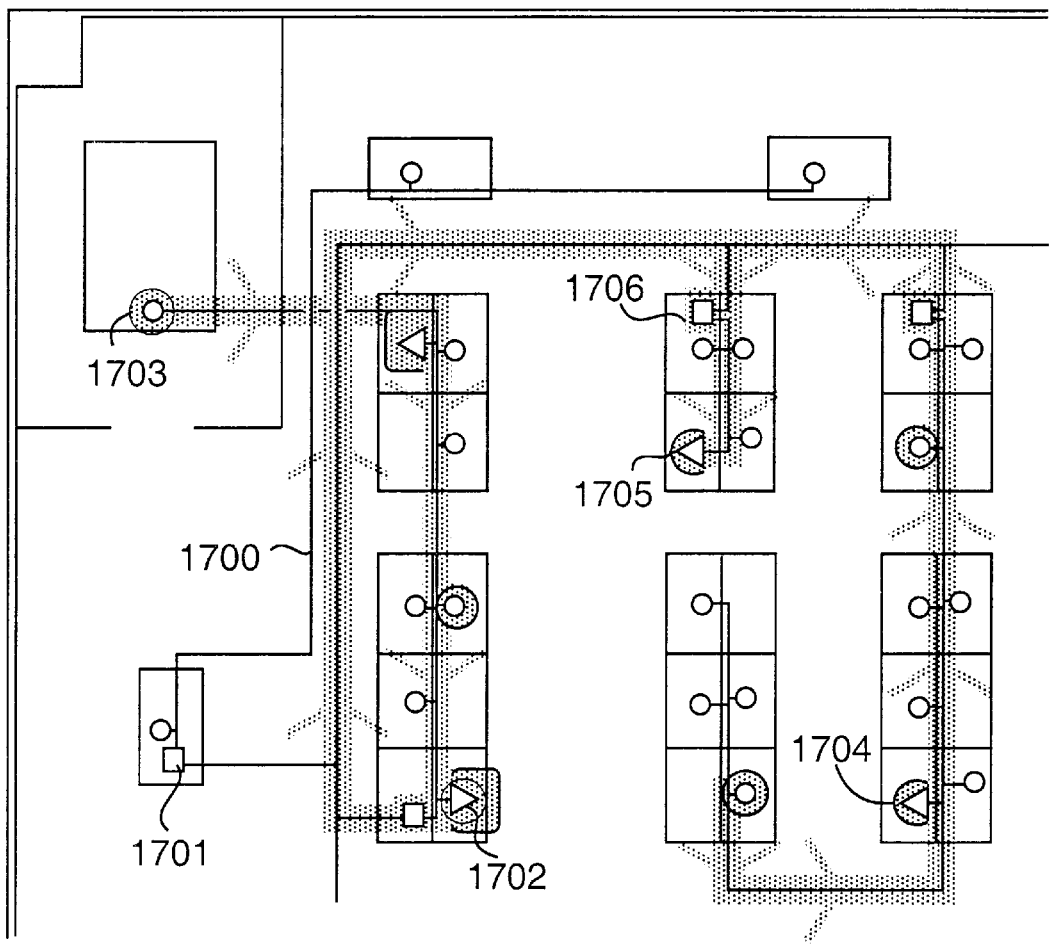
FIG. 20 is a flowchart showing a display example of the detected result of the static connection relation between a server and a client of the entire network of this embodiment.

An example of the display form in step 1609 in the case where a service name was specified in step 1602 is shown in FIG. 20.

Reference numeral 1700, shown in FIG. 20, represents a communication network, reference numeral 1701 network equipment, reference numeral 1702 an computer, reference numeral 1703 a terminal, and reference numeral 1704 the managed equipment which is the client of the service specified in step 1602. Reference numeral 1705 represents the managed equipment which is the server of the service. Reference numeral 1706 represents the managed equipment which constitutes the physical connection route between both pieces of equipment retrieved in step 1608.

Furthermore, the network management system, if either the managed equipment 1704 which is a client displayed as in FIG. 20 or the managed equipment 1705 which is a server is specified with the input unit by the user, will display the detail information about the static connection relation of the managed equipment to the entire network.

When the specified managed equipment is a client, a managed equipment ID corresponding to the managed equipment ID of the specified client equipment is extracted from the static client list for all pieces of managed equipment (130 of FIG. 16) generated in step 1606 of a flowchart shown in FIG. 19, and the extracted result is displayed as detail information.

When, on the other hand, the specified managed equipment is a server, a corresponding list is detected from the static client list for all pieces of managed equipment (130 of FIG. 16) generated in step 1606 of a flowchart shown in FIG. 19 by using the managed equipment ID, and the detected list is displayed as detail information.

The display of the static connection relation of the entire network is not limited to the form shown in FIG. 20 but the form of display can be changed by arbitrary changing the display color 1122, line font 1123, access frequency 1124, and display order 1125 of the display data base 1120 shown in FIG. 13 by the user.

When a great number of clients that are accessed exist, it is possible to make large the display form of the managed equipment 1705 which is a server or make thick the display form of the managed equipment 1706 which constitutes a physical connection route. Also, when the display of the static connection relations regarding d plurality of services is performed, it is also possible to change a color of display in correspondence with the kind of the service.

Therefore, as has been described, the information about the logical and static connection relation of the network equipment on the network is displayed on the network form drawing for smooth operation and management of the network. Therefore, the static dependent relation between pieces of network equipment, the direction of dependence, and the setting of the degree or frequency of dependence can be visually grasped.

Also, in accordance with the aforementioned means, a plurality of pieces of information about the logical and static connection relation of the network equipment on the network are integrated and the degree of importance of each piece of network equipment to the network is displayed on the network form drawing. Therefore, the critical point of a network which is an object of management can be grasped and traffic tendency can be predicted.

Next, what service a certain computer (which is a piece of managed equipment) requires of another piece of managed equipment at a certain point of time, that is, the process of specifying a piece of managed equipment which is the client of certain service, detecting the dynamic connection status between the server and the client about the service, and displaying the detected result onto the network form drawing shown in FIG. 3, will be described along a flowchart of FIG. 21 by using the managed equipment data base 40 of FIG. 4, the service name data base 60 of FIG. 6, the process table 90 of FIG. 9, and the traffic data base 99 of FIG. 10.

Figure 21:
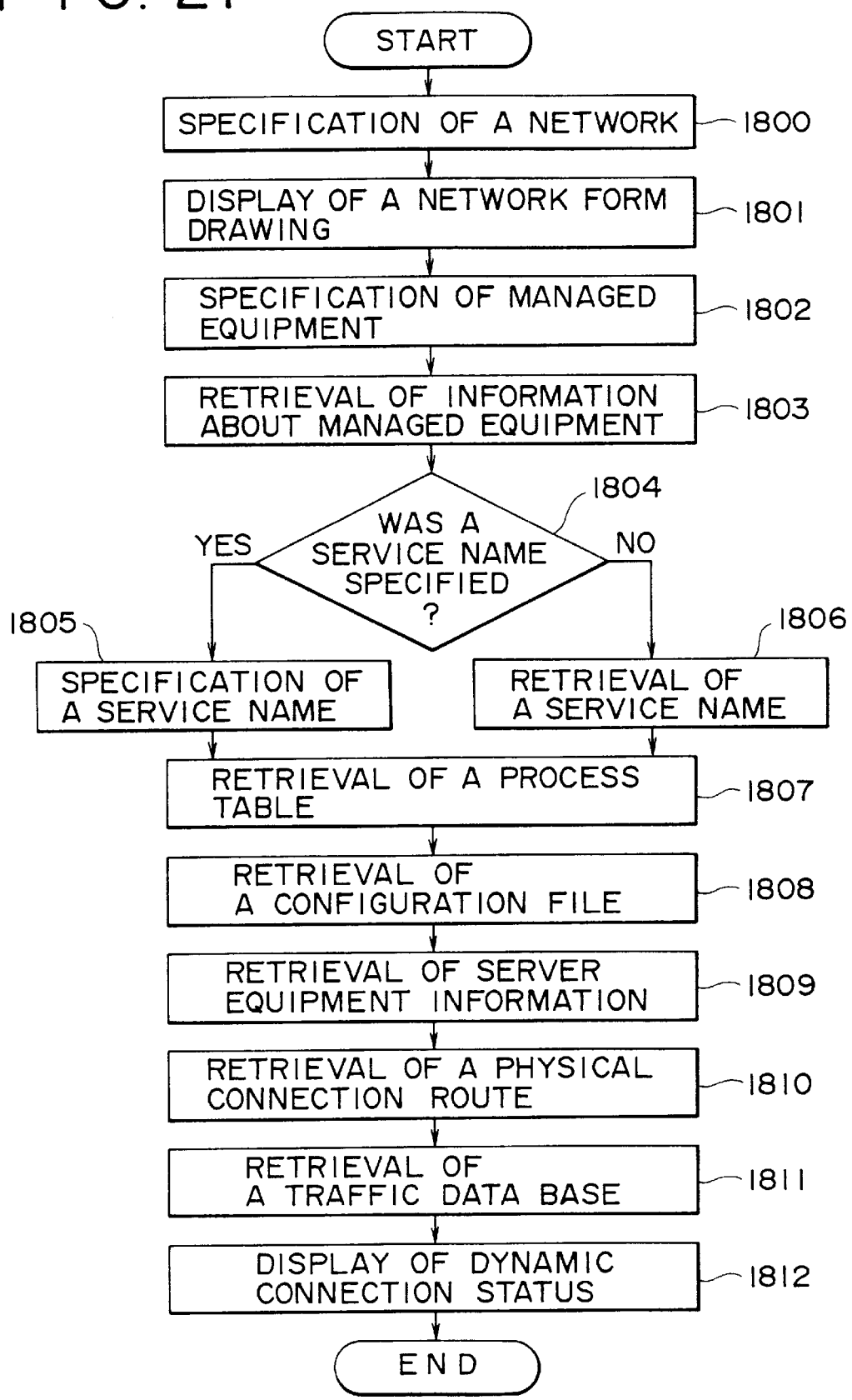
FIG. 21 is a flowchart showing the processing procedure of this embodiment of specifying managed equipment which is a client, detecting the dynamic connection status between the client and a server, and displaying the result.

In the process of displaying the dynamic connection status onto the network form drawing, as shown in FIG. 21, the network which detects and displays the dynamic connection status is first specified with the input unit by the user of the network management system (step 1800).

The network management system displays the network form drawing of the specified network on the output unit (step 1801).

The managed equipment (client), which detects and displays dynamic connection status, is specified on the network form drawing with the input unit by the user of the network management system (step 1802).

Thereafter, the network management system retrieves the information about the specified managed equipment from the managed equipment data base 40 of FIG. 4 (step 1803).

The existence of the specification of a service name which is retrieved is inquired to the user of the network management system (step 1804).

When, in step 1804, the user specifies a service name, step 1804 advances to step 1805. When, on the other hand, the user does not specify a service name, all service names are retrieved and step 1804 advances to step 1806.

In step 1805 a service name which is retrieved is specified by the user of the network management system.

In step 1806 the service name and configuration file name, which are used under network environment by the managed equipment (as a client), are retrieved from the service name data base 60 of FIG. 6 by using the classification information which is contained in the information about the managed equipment retrieved in step 1803. Note that the managed equipment where the partition has not been defined in the service name data base 60 will be handled as a client.

The process of the service name specified in step 1805 or the process of the service name specified in step 1806 is retrieved from the process table 90 shown in FIG. 9 which is held in the interior of the managed equipment (which becomes a client)by using the managed equipment ID which is contained in the information about the managed equipment retrieved in step 1803 (step 1807).

With the result in step 1807 where a service being executed by the managed equipment is retrieved from the process table, the configuration file is retrieved from the service name data base 60, and the managed equipment ID and the machine name of the equipment which becomes the server of the service are retrieved. Furthermore, the access frequency is retrieved according to the kind of the service (step 1808).

With the managed equipment ID and the machine name of the equipment which becomes the server, retrieved in step.1808, the information about the equipment which becomes the server and the corresponding geometrical figure on the network form drawing are retrieved from the managed equipment data base 40 of FIG. 4 (step 1809).

The managed equipment constituting the physical connection route (connection between equipment and a cable) between pieces of managed equipment and the information about the managed equipment are retrieved from the managed equipment data base 40 of FIG. 4 by using the connection information stored in the managed equipment data base of the server retrieved in step 1809 and the connection information about the managed equipment which is the client specified in step 1802 (step 1810).

The header portion of a packet, which is flowing through the network on the physical connection route retrieved in step 1810, is retrieved from the traffic data base 99 of FIG. 10 where traffic data are collected for a predetermined constant period of time (step 1811).

The dynamic connection status of the managed equipment specified in step 1802 is displayed in recognizable form on the network form drawing displayed in step 1801 by using the kind of the service and the access frequency retrieved in step 1808, the geometrical figure of the server retrieved in step 1809, the information about the managed equipment constituting the physical connection route retrieved in step 1810, and the traffic data retrieved in step 1811 (step 1812).

Figure 22:
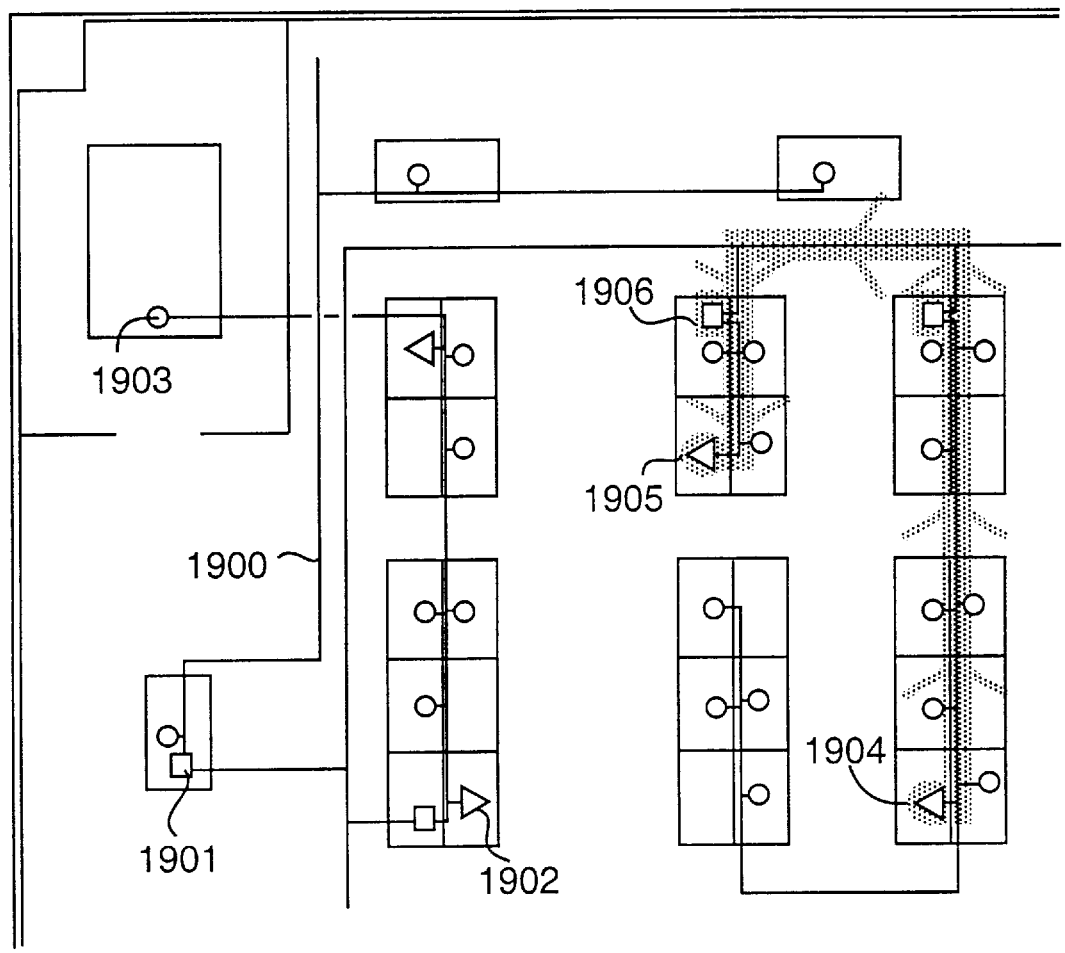
FIG. 22 is a diagram showing a display example of the result of the dynamic connection status between a server and a client of this embodiment detected in the case where the managed equipment which is the server is specified.

An example of the display form in step 1812 in the case where a service name was specified in step 1806 is shown in FIG. 22.

Reference numeral 1900, shown in FIG. 22, represents a communication network, reference numeral 1901 network equipment, reference numeral 1902 an computer, reference numeral 1903 a terminal, and reference numeral 1904 the managed equipment which is the client of the service specified in step 1802, and reference numeral 1905 the managed equipment which is the server of the service retrieved in step 1809. Reference numeral 1906 represents the managed equipment which constitutes the physical connection route between both pieces of equipment retrieved in step 1810.

The display of the dynamic connection status is not limited to the form shown in FIG. 22 but the form of display can be changed by arbitrary changing the display color 1122, line font 1123, access frequency 1124, and display order 1125 of the display data base 1120 shown in FIG. 13 by the user.

When a great number of clients that are accessed exist, it is possible to make large the display form of the managed equipment 1905 which is a server or make thick the display form of the managed equipment 1906 which constitutes a physical connection route.

Also, when the display of the dynamic connection statuses regarding a plurality of services is performed, it is also possible to change a color of display in correspondence with the kind of the service.

In addition, by filtering a user name or extracting a process being executed by a user by using the information of the process table 90 of FIG. 9, it is also possible to display who the client on the network is and how the service of a network is being used.

Furthermore, the network management system, if either the managed equipment 1904 which is a client displayed as in FIG. 22 or the managed equipment 1905 which is a server or the managed equipment 1906 which constitutes a physical connection route is specified with the input unit by the user, will display the detail information about the dynamic connection status of the managed equipment.

If the specified managed equipment is a client, the managed equipment ID 400, classification 402, and machine name 404 of FIG. 4, the service name 601 and the protocol or demon 602 on the client side of FIG. 6, the retrieved result of the process table retrieved in step 1807 of the flowchart shown in FIG. 21, the managed equipment ID and machine name of the equipment which becomes the server retrieved in step 1808 of the flowchart shown in FIG. 21, and the access frequency corresponding to the kind of a service will be displayed as detail information.

When, on the other hand, the specified managed equipment is a server, the managed equipment ID 400, classification 402, and machine name 404 of FIG. 4, the service name 601 and the protocol or demon 602 on the server side of FIG. 6, and the server equipment information retrieved in step 1809 of the flowchart shown in FIG. 21 are displayed as detail information.

Furthermore, when the specified managed equipment is a physical connection route, the managed equipment ID 400, classification 402, and machine name 404 of FIG. 4, the service name 601 of FIG. 6, and the traffic data retrieved from the traffic data base 99 of FIG. 10 in step 1811 of the flowchart shown in FIG. 21 are displayed as detail information.

Next, what service a certain computer (which is a piece of managed equipment) supplies to another piece of managed equipment at a certain point of time, that is, the process of specifying a piece of managed equipment which is the client of certain service, detecting the dynamic connection status between the server and the client about the service, and displaying the detected result onto the network form drawing shown in FIG. 3, will be described along a flowchart of FIG. 24 by using the managed equipment data base 40 of FIG. 4, the service name data base 60 of FIG. 6, the process table 90 of FIG. 9, the traffic data base 100 of FIG. 10, and the dynamic client list of FIG. 23.

Figure 23:
FIG. 23 is a diagram showing the configuration of a dynamic client list of this embodiment.

With respect to the service which is being used under network environment at a certain point of time, FIG. 23 shows the configuration of a dynamic client list where the service of a certain server and a client are listed. In this embodiment, this list is referred to as a dynamic client list.

Figure 24:
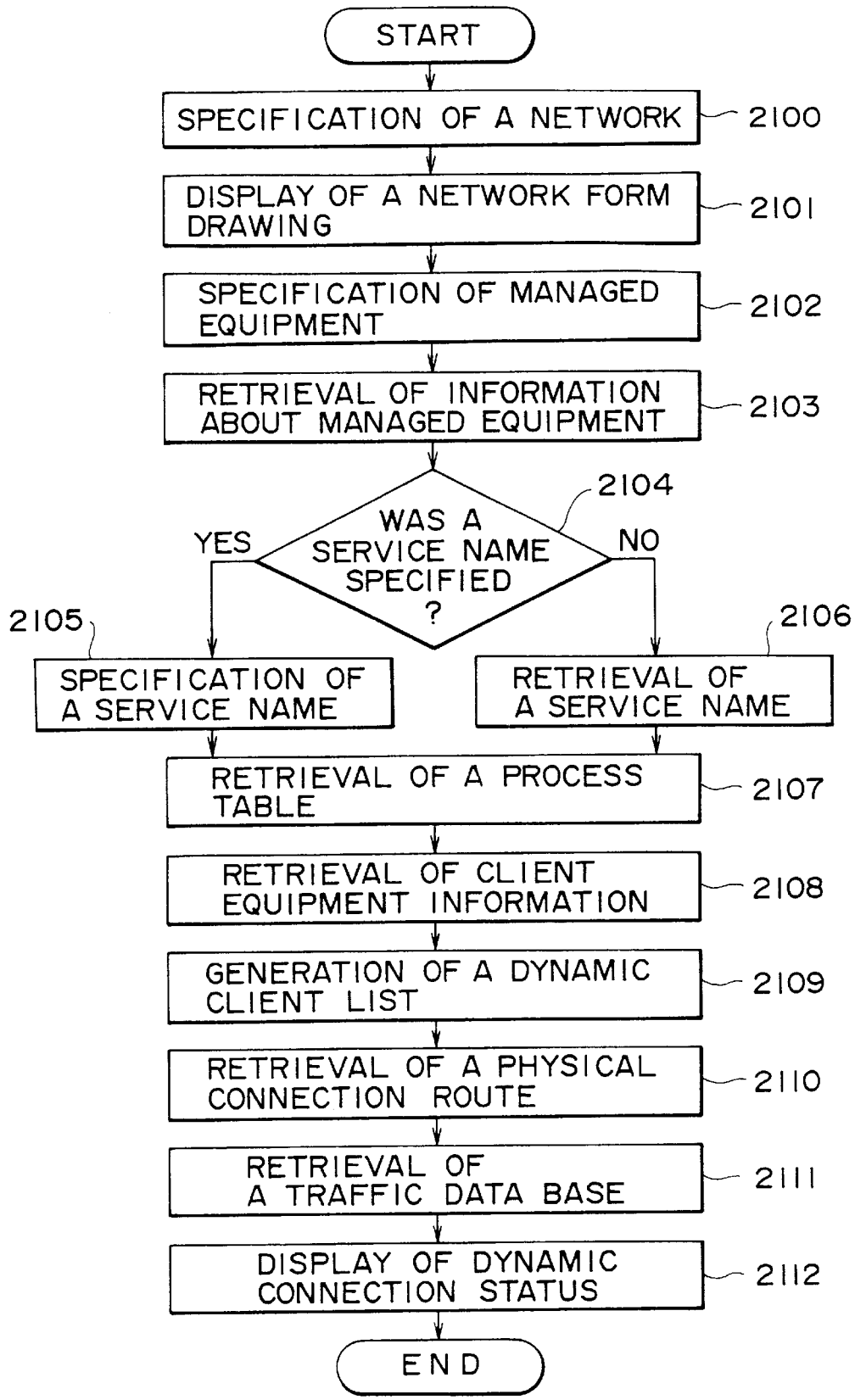
FIG. 24 is a flowchart showing the processing procedure of this embodiment of specifying managed equipment which is a server, detecting the dynamic connection status between the server and a client, and displaying the result.

The dynamic client list 200, shown in FIG. 23, is a temporary file that the network management system generates during the processing procedure described in the flowchart of this embodiment shown in FIG. 24, and the file is erased when the processing ends.

Reference numerals 2000 through 2002, shown in FIG. 23, denote pieces of information on the server side and reference numerals 2003 through 2007 denote pieces of information on the client side.

In FIG. 23 reference numeral 2000 represents the service name which is supplied by a server and reference numeral 2001 represents the protocol or demon which is starting on the server side which corresponds to the service name 2000. Reference numeral 2000 represents the process ID of the service. Reference numeral 2003 represents the protocol or demon which is starting on the client side which corresponds to the service name 2000. Reference numeral 2004 represents the process ID of the service on the client side. Reference numeral 2005 represents the service configuration file name which has been set on the client side. Reference numeral 2006 represents the identification number of managed equipment which has become a client. Reference numeral 2007 represents the set content, for example, the access frequency of the service described in the configuration file 2003 on the side of a client 2005.

In the process of displaying the dynamic connection status onto the network form drawing, as shown in FIG. 24, the network which detects and displays the dynamic connection status is first specified with the input unit by the user of the network management system (step 2100).

The network management system displays the network form drawing of the specified network on the output unit (step 2101).

The managed equipment (server), which detects and displays dynamic connection status, is specified on the network form drawing with the input unit by the user of the network management system (step 2102).

Thereafter, the network management system retrieves the information about the specified managed equipment from the managed equipment data base 40 of FIG. 4 (step 2103).

The existence of the specification of a service name which is retrieved is inquired to the user of the network management system (step 2104).

When, in step 2104, the user specifies a service name, step 2104 advances to step 2105. When, on the other hand, the user does not specify a service name, all service names are retrieved and step 2104 advances to step 2106.

In step 2105 a service name which is retrieved is specified by the user of the network management system.

In step 2106 the service name and configuration file name, which are used under network environment by the managed equipment (as a client), are retrieved from the service name data base 60 of FIG. 6 by using the classification information which is contained in the information about the managed equipment retrieved in step 2103.

Either the service name specified by the user in step 2105 or the service name, which the managed equipment specified in step 2106 has used under network environment as a server, is retrieved from the process table 90 of the managed equipment shown in FIG. 9 by using the managed equipment ID which is contained in the formation about the managed equipment retrieved in step 2103. The result is written to the server information portion of the dynamic client list 200 shown in FIG. 23 (step 2107).

Here, when the user specifies a single service name in step 2105, the service name 2000 and the protocol or demon 2001 of the dynamic client list 200 of FIG. 23 become only a single item, respectively.

With the service name being executed at a certain point of time by the managed equipment which is a server, retrieved in step 2107, the kind of the server which has been set as a server is retrieved from the service name data base 60 of FIG. 6 and the configuration file of the service. Furthermore, in correspondence with the kind of the service, the service frequency, the corresponding service name on the client side, and the configuration file name are retrieved (step 2108).

With respect to all pieces of managed equipment other than the managed equipment (server) specified in step 2102, the process of the service being executed at that time is retrieved from the process tables of all pieces of managed equipment other than the managed equipment (server) by using the service name and configuration file name on the client side retrieved in step 2108, while referring to the data base of the managed equipment shown in FIG. 4. The retrieved process is written to the client information portion of the dynamic client list 200 shown in FIG. 23 (step 2109).

Then, the managed equipment constituting the physical connection route (connection between equipment and a cable) between the server specified in step 2102 and the client of certain service embedded in the dynamic client list in step 2109 and the information about that piece of managed equipment are retrieved from the managed equipment data base 40 of FIG. 4 by using the connection information of each piece of managed equipment stored in the managed equipment data base (step 2110).

The header portion of the packet, which is flowing through the network on the physical connection route retrieved in step 2110, is retrieved from the traffic data base 99 of FIG. 10 where traffic data are collected for a predetermined constant period of time (step 2111).

The dynamic connection status of the managed equipment (sever) specified in step 2102 is displayed in recognizable form on the network form drawing displayed in step 2101 by using the dynamic client list generated in step 2109, the information about the managed equipment constituting the physical connection route retrieved in step 2110, and the traffic data retrieved from the traffic data base in step 2111 (step 2112).

Figure 25:
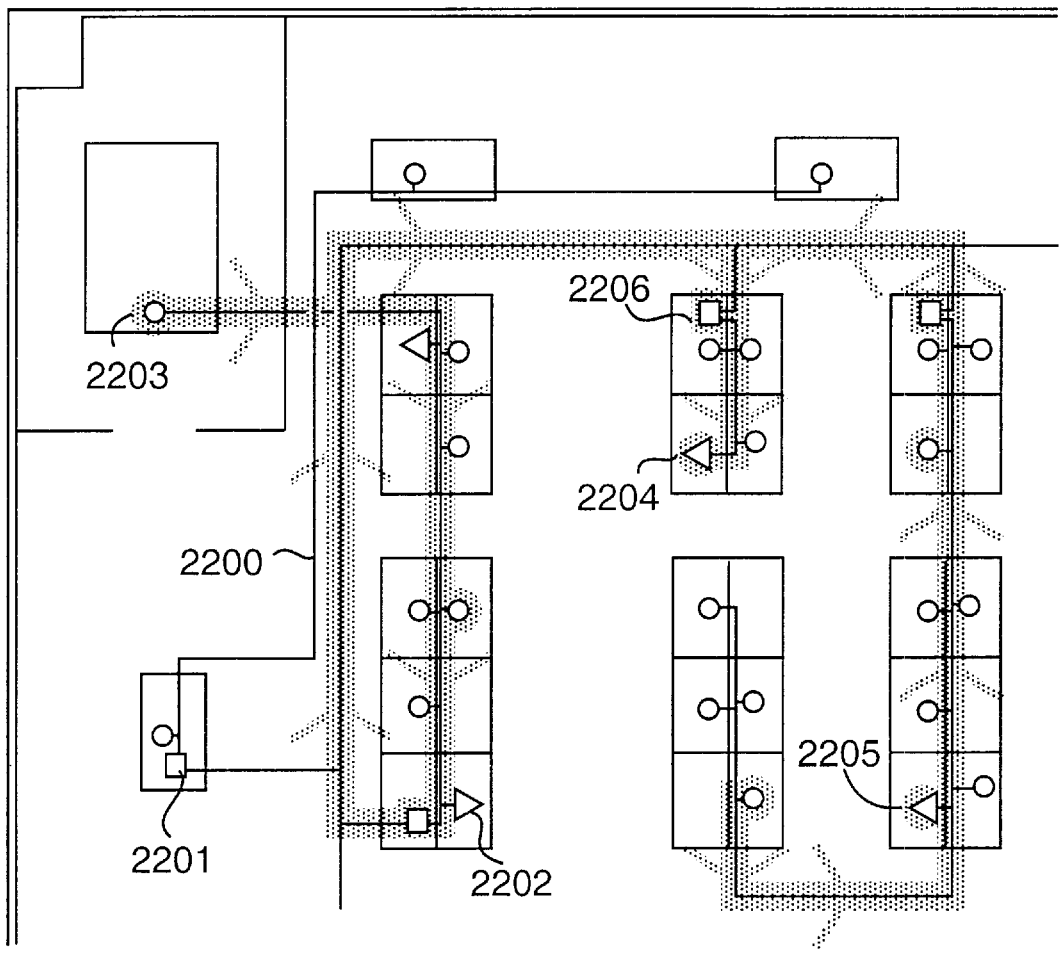
FIG. 25 is a diagram showing a display example of the result of the dynamic connection status between a server and a client of this embodiment detected in the case where the managed equipment which is the server is specified.

An example of the display form in step 2111 in the case where a service name was specified in step 2104 is shown in FIG. 25.

Reference numeral 2200, shown in FIG. 25, represents a communication network, reference numeral 2201 network equipment, reference numeral 2202 an computer, reference numeral 2203 a terminal, and reference numeral 2204 the managed equipment which is the server of the service specified in step 2102. Reference numeral 2205 represents the managed equipment which is the client of the service specified in step 2108. Reference numeral 2206 represents the managed equipment which constitutes the physical connection route between both pieces of equipment retrieved in step 2110.

The display of the dynamic connection status is not limited to the form shown in FIG. 25 but the form of display can be changed by arbitrary changing the display color 1122, line font 1123, access frequency 1124, and display order 1125 of the display data base 1120 shown in FIG. 13 by the user.

When a great number of clients that are accessed exist, it is possible to make the display form of the managed equipment 2204 larger which is a server or make the display form of the managed equipment 2206 thicker which constitutes a physical connection route.

Also, when the display of the dynamic connection statuses regarding a plurality of services is performed it is also possible to change a color of display in correspondence with the kind of the service.

In addition, by filtering a user name or extracting a process being executed by a user by using the information of the process table 90 of FIG. 9, it is also possible to display whom on the network the managed equipment (server) specified in step 2102 is supplying the service of the network.

Furthermore, the network management system, if either the managed equipment 2204 which is a server displayed as in FIG. 25 or the managed equipment 2205 which is a client or the managed equipment 2206 which constitutes a physical connection route is specified with the input unit by the user, will display the detail information about the dynamic connection status of the managed equipment.

If the specified managed equipment is a server, the dynamic client list (200 of FIG. 23) generated in step 2109 of the flowchart of FIG. 24 will be displayed as detail information.

When, on the other hand, the specified managed equipment is a client, a managed equipment ID corresponding to the managed equipment ID of the specified client equipment is extracted from the dynamic client list (200 of FIG. 23) generated in step 2109 of the flowchart of FIG. 24, and the extracted result is displayed as detail information.

Furthermore when the specified managed equipment is a physical connection route, the traffic data retrieved from the traffic data base 99 in step 2111 of the flowchart shown in FIG. 24 is displayed as detail information.

Now, the process of detecting the dynamic connection status over the entirety of a certain network managed by the network manager and displaying the detected result onto the network form drawing shown in FIG. 3 will be described along a flowchart of FIG. 26 by using the managed equipment data base 40 of FIG. 4, the service name data base 60 of FIG. 6, the process table 90 of FIG. 9, the traffic data base 100 of FIG. 10, and the dynamic client list of FIG. 23.

Figure 26:
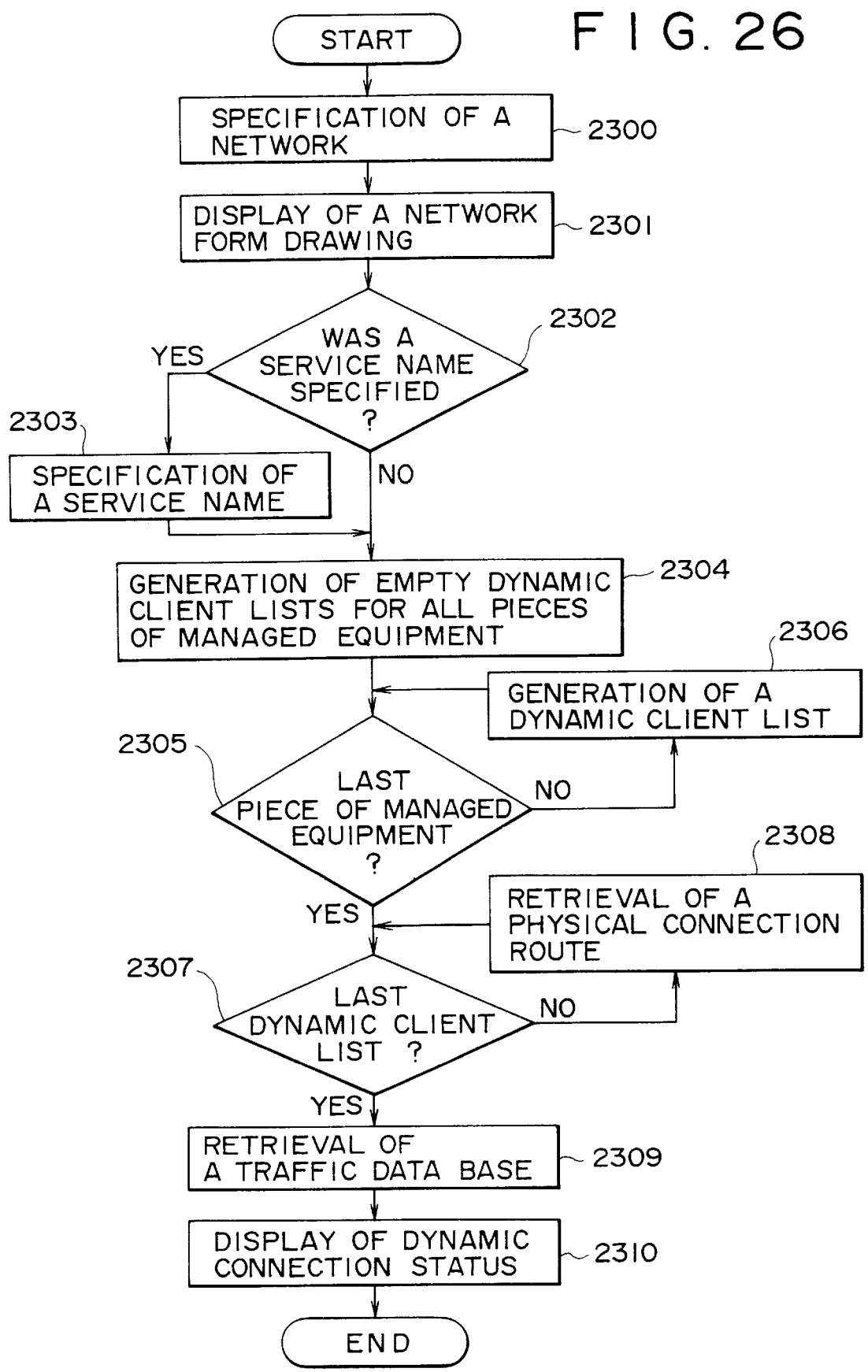
FIG. 26 is a flowchart showing the processing procedure of this embodiment of detecting the dynamic connection status between a server and a client of the entire network and displaying the result.

In the process of displaying the aforementioned dynamic connection status onto the network form drawing, as shown in FIG. 26, the network which detects and displays the dynamic connection status is first specified with the input unit by the user of the network management system (step 2300).

The network management system displays the network form drawing of the specified network on the output unit (step 2301).

The existence of the specification of a service name which is retrieved is inquired to the user of the network management system (step 2302).

When, in step 2302, the user specifies a service name, step 2302 advances to step 2303. When, on the other hand, the user does not specify a service name, all service names are retrieved and step 2302 advances to step 2304.

The service name which is retrieved is specified by the user of the network management system (step 2303).

An empty dynamic client list is generated for all pieces of managed equipment stored in the managed equipment data base 40 of FIG. 4 (step 2304).

The first piece of managed equipment is retrieved from the managed equipment data base 40 of FIG. 4 and the retrieving is repeated through step 2306 until the last piece of managed equipment is retrieved (step 2305).

The managed equipment, retrieved in step 2305, is grasped as a client, and in FIG. 21 which is a flowchart of a dynamic connection status display process of specifying a client to detect a server, the same steps as steps 1807 through 1809 are performed in order to retrieve the service where the managed equipment has become a client and also retrieve the server of the service. The retrieved result is written to the client information portion of the dynamic client list of the managed equipment which has become the server.

Furthermore, the managed equipment, retrieved in step 2305, is grasped as a server, and in FIG. 24 which is a flowchart of a dynamic connection status display process of specifying a sever to detect a client, the same steps as steps 2107 through 2109 are performed in order to retrieve the service where the managed equipment has become a server and also retrieve the client of the service. The retrieved result is written to the server information portion of the dynamic client list of the managed equipment (step 2306).

If step 2306 ends, the network management system moves an object of retrieval to the next item of the managed equipment data base 40 and repeats steps 2305 and 2306 until the last of the managed equipment data base.

Step 2305 will advance to step 2307 if the aforementioned steps come to the end of the managed equipment data base 40.

Then, from the first piece of managed equipment of the managed equipment data base 40 of FIG. 4 to the last piece of managed equipment, the processing in step 2308 is performed with respect to the dynamic client list of each piece of managed equipment to which the retrieved result was written in step 2306 (step 2307).

The dynamic client list of each piece of managed equipment to which the retrieved result was written in step 2306 is retrieved, and for each item of the list which is not empty, the physical connection route between the managed equipment which has become a server and the managed equipment which has become a client is retrieved in the same way as step 2110 in FIG. 24 which is a flowchart of a process of specifying a server to detect a client (step 2308).

If step 2308 ends, the network management system moves an object of retrieval to the next item of the managed equipment data base 40 and repeats steps 2307 and 2308 until the last piece of managed equipment of the managed equipment data base.

If, in step 2307, the last of the managed equipment data base 40 is processed, that is, if the last dynamic client list is processed, step 2307 will advance to step 2309.

The header portion of the packet, which is flowing through the network on the physical connection route retrieved in step 2308, is retrieved from the traffic data base 99 of FIG. 10 where traffic data are collected for a predetermined constant period of time (step 2309).

The dynamic connection status of the entire network is displayed in recognizable form on the network form drawing displayed in step 2301 by using the dynamic client list generated in step 2306, the information about the managed equipment which constitutes the physical connection route retrieved in step 2308, and the traffic data retrieved from the traffic database 99 in step 2309 (step 2310).

Figure 27:
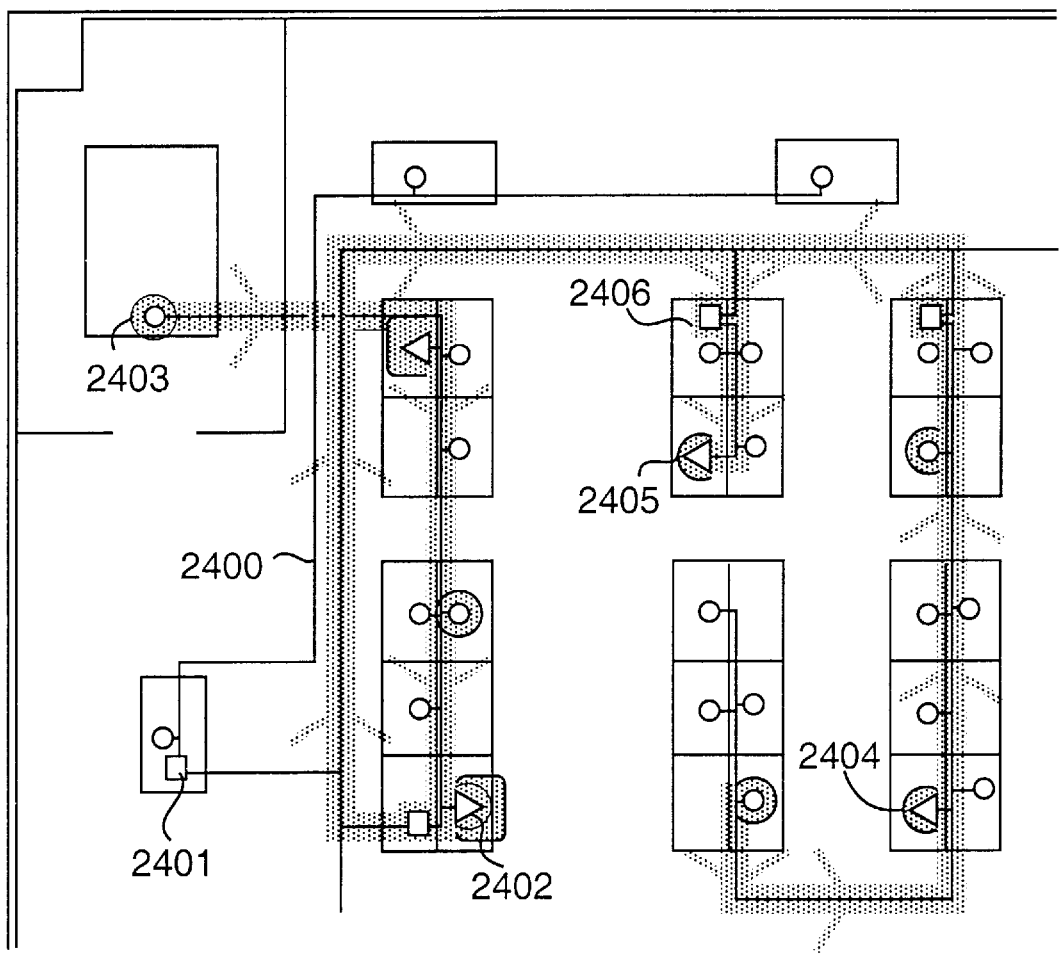
FIG. 27 is a flowchart showing a display example of the detected result of the dynamic connection status between a server and a client of the entire network of this embodiment.

An example of the display form in step 2309 in the case where a service name was specified in step 2302 is shown in FIG. 27. Reference numeral 2400, shown in FIG. 27, represents a communication network, reference numeral 2401 network equipment, reference numeral 2402 an computer, and reference numeral 2403 a terminal. The reference numeral 2404 represents the managed equipment which is the client of the service specified in step 2302. Reference numeral 2405 represents the managed equipment which is the server of the service retrieved in step 2306. Reference numeral 2406 represents the managed equipment which constitutes the physical connection route between both pieces of equipment retrieved in step 2308.

The display of the dynamic connection status is not limited to the form shown in FIG. 27 but the form of display can be changed by arbitrary changing the display color 1122, line font 1123, access frequency 1124, and display order 1125 of the display data base 1120 shown in FIG. 13 by the user.

When a great number of clients that are accessed exist, it is possible to make the display form of the managed equipment 2405 larger which is a server or make the display form of the managed equipment 2406 thicker which constitutes a physical connection route. Also, when the display of the dynamic connection statuses regarding a plurality of services is performed, it is also possible to change a color of display in correspondence with the kind of the service.

In addition, by filtering a user name or extracting a process being executed by a user by using the information of the process table 90 of FIG. 9, it is also possible to display who the client on the network is and what service is being used as a client from the entire network.

Furthermore, the network management system, if either the managed equipment 2405 which is a server displayed as in FIG. 27 or the managed equipment 2404 which is a client or the managed equipment 2406 which constitutes a physical connection route is specified with the input unit by the user, will display the detail information about the dynamic connection status of the managed equipment.

When the specified managed equipment is a server, the dynamic client list (200 of FIG. 23) generated in step 2306 of the flowchart of FIG. 26 will be displayed as detail information. When, on the other hand, the specified managed equipment is a client, a managed equipment ID corresponding to the managed equipment ID of the specified client equipment is extracted from the dynamic client list (200 of FIG. 23) generated in step 2306 of the flowchart of FIG. 26, and the extracted result is displayed as detail information.

Furthermore, when the specified managed equipment is a physical connection route, the traffic data retrieved from the traffic data base 99 in step 2309 of the flowchart shown in FIG. 26 is displayed as detail information.

FIG. 28 shows the configuration of a fourth data base 280 where information about wireless communicable network equipment is stored without connecting a network by cable wiring. The wireless communication in this embodiment means wireless communication which is performed through light or radio waves, such as infrared rays, microwaves, or electro-magnetic waves. On the other hand, in the aforementioned network which performs communication through the cables wired to equipment, as has been described, wired communication is performed.

In FIG. 28, a managed equipment ID 2800, as with the data base 40 of FIG. 4, represents the identification number which can exclusively determine the managed equipment that is communicable by wireless. This managed equipment ID 2800 is allocated to the managed equipment's graphic data of the network form drawing that is displayed by the network management system. Wireless communication type 2801 is used for identifying the wireless communication method of the managed equipment which is communicable by wireless.

Managed equipment ID 2802 is the managed equipment ID of the equipment which is mutually communicable by the communication method 2801 Remote control 2803 is an item for determining whether managed equipment can be controlled remotely. Machine name 2804 is the name of the managed equipment on the network.

Next, the process of displaying the logical and static connection relation by cable wiring will be described along a flowchart of FIG. 29 by using the managed equipment data base 40 of FIG. 4, the start file name data base 70 of FIG. 7, and the wireless communication equipment data base 280 of FIG. 28.

Figure 29:
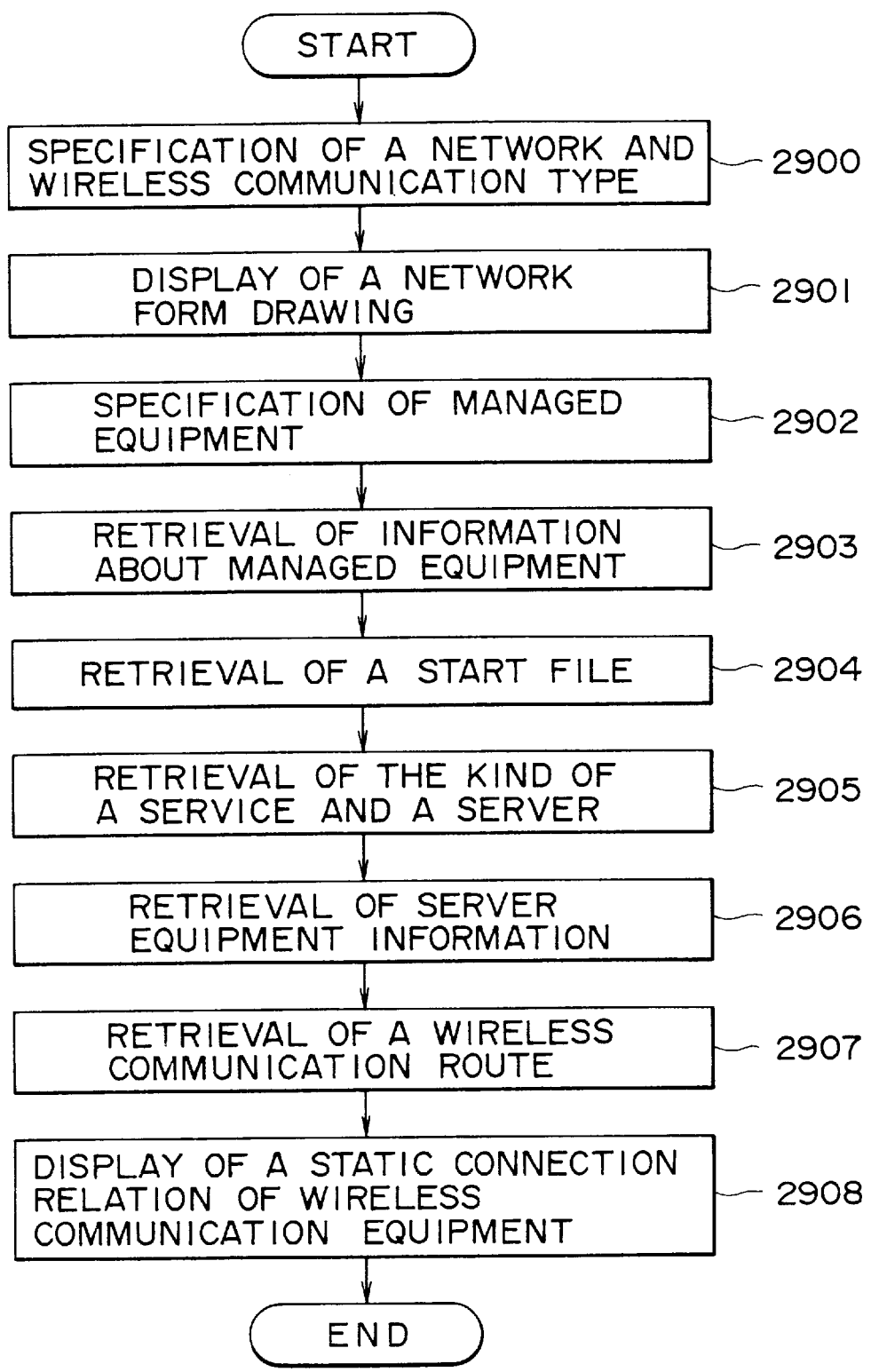
FIG. 29 is a flowchart showing the static connection status of wireless connection equipment.

In step 2900 of FIG. 29, a static connection relation is detected by the user of the network management system, and a network and wireless communication type which are displayed are specified with the input unit.

In step 2901 the network management system displays the network form drawing of the specified network on the output unit.

In step 2902 the static connection relation is detected on the network form drawing by the user of the network management system, and wireless communicable managed equipment (client) which is displayed is specified with the input unit.

In step 2903 the network management system retrieves the information about the specified managed equipment from the managed equipment data base 40 of FIG. 4.

Furthermore, the wireless communication type and communicable equipment ID of the specified managed equipment are retrieved by using the wireless communication equipment data base 280 of FIG. 28.

In step 2904 the start file, which is used when the managed equipment is started, is retrieved from the start file name database 70 of FIG. 7 by using the managed equipment ID which is contained in the information about the managed equipment retrieved in step 2903.

In step 2905, the kind of a service set as a client, the managed equipment ID and machine name of equipment which becomes a server, and furthermore the access frequency corresponding to the kind of the service are retrieved from the start file and configuration file of the managed equipment by using the service name which is used under network environment by the managed equipment specified by the user in step 2902, the server supplying the service, the start file retrieved in step 2904 that the managed equipment uses when it is started, and furthermore the configuration file name of the managed equipment.

In step 2906, the information about the equipment which becomes a server and the corresponding geometrical figure on the network form drawing are retrieved from the managed equipment data base 40 of FIG. 4 by using the managed equipment ID and machine name of the equipment retrieved in step 2905 which becomes a server.

In step 2907, the managed equipment constituting the physical connection route between both pieces of managed equipment and the information about the managed equipment are retrieved from the managed equipment data base 40 of FIG. 4 by using the managed equipment and the wireless communicable equipment ID retrieved in step 2902, the connection information stored in the managed equipment data base 40 of the server, and the connection information about the managed equipment (client) specified in step 2902.

In step 2908, the static connection relation of the managed equipment specified in step 2902 is displayed in recognizable form on the network form drawing displayed in step 2901 by using the kind of the service or the access frequency retrieved in step 2905, the geometrical figure of the server retrieved in step 2906, and the information about the managed equipment constituting the wireless communication connection route retrieved in step 2907.

Figure 30:
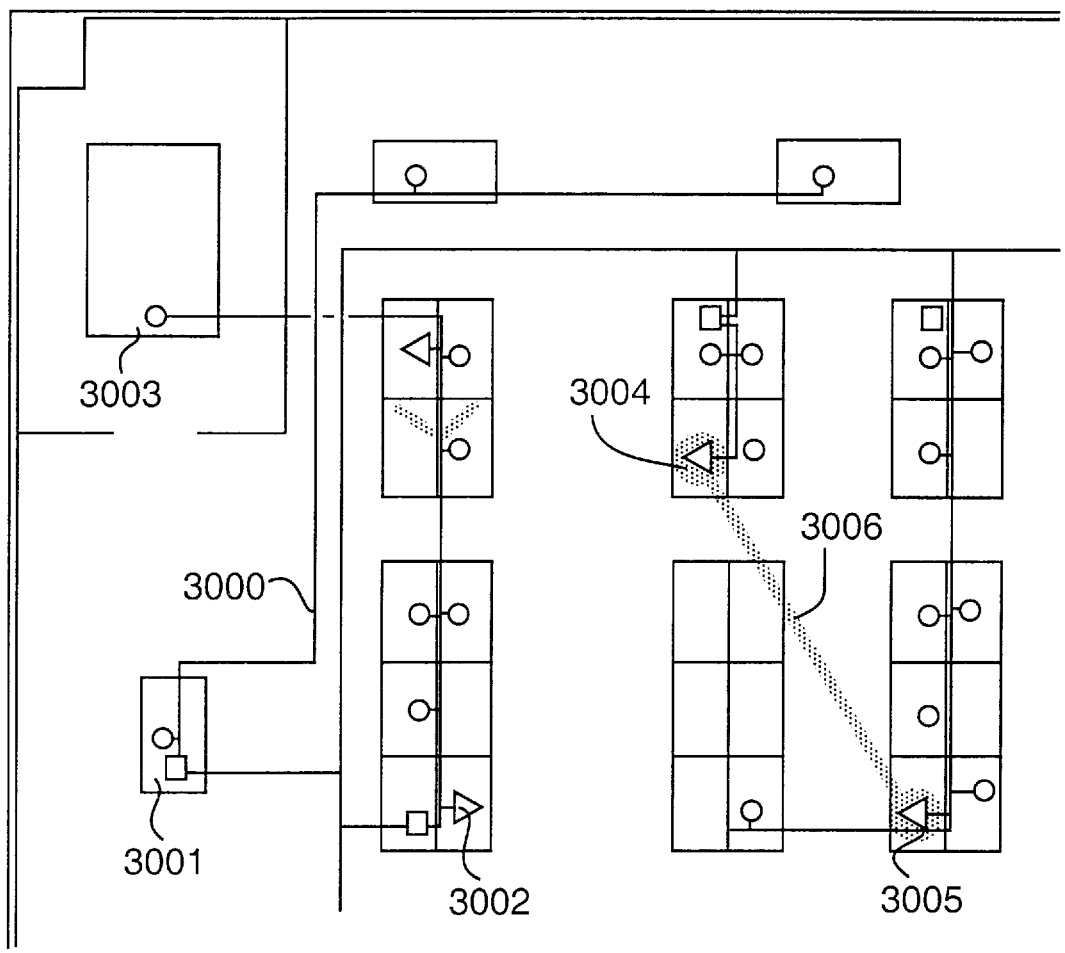
FIG. 30 is a diagram showing the static connection status of the wireless connection equipment.

A display example of the static connection relation of the wireless connection equipment in step 2911 is shown in FIG. 30. Reference numeral 3000 of FIG. 30 represents a communication network, reference numeral 3001 network equipment, reference numeral 3002 an computer, and reference numeral 3003 a terminal. Reference numeral 3004 represents the managed equipment specified in step 2902. Reference numeral 3005 represents the managed equipment which is communicable with the managed equipment 3004 by wireless. Reference numeral 3006 is the wireless communication route between both pieces of managed equipment, retrieved in step 2910.

Furthermore, the network management system, if the managed equipment 3004 (client) displayed as in FIG. 30 is specified with the input unit by the user, will display the detail information about the static connection relation of the managed equipment to the entire network.

A display example of the detail information is shown in FIG. 36. It can be grasped from the detail information how the static connection relation of a certain piece of managed equipment, specified with the input unit by the user, is related to another piece of managed equipment within the network.

In FIG. 36, reference numerals 3600 through 3602 denote pieces of server information and reference numerals 3603 through 3606 denote pieces of client information.

Reference numeral 3600 denotes the managed equipment ID of the server of certain service. When the managed equipment specified by the user is a server which is supplying some service to another piece of equipment, this item is expressed by "-". Reference numeral 3601 denotes the service name of the service that a server provides. Reference numeral 3602 denotes the protocol or demon that is used in the service name 3601.

Reference numeral 3603 denotes the managed equipment ID of the client of certain service. Reference numeral 3604 denotes the protocol or demon which is used for receiving service on the client side. Reference numeral 3605 denotes the configuration file name that is set for receiving service on the client side. Reference numeral 3606 denotes the set content, for example, the access frequency of the service within the configuration file. When the managed equipment specified by the user is a client, the managed equipment ID of the client information, as with 3600, is expressed by "-".

The display of the static connection relation of the entire network is not limited to the form shown in FIG. 30 but the form of display can be changed by arbitrary changing display colors, line fonts, or display widths by the user. When a great number of clients that are accessed exist it is possible to make the managed equipment 3005 larger which is a server or make the wireless communication route 3006 thicker. Also, when the display of the static connection relations regarding a plurality of services is performed, it is also possible to change a color of display in correspondence with the kind of the service.

Next, the process of detecting the logical and dynamic connection status of the network equipment which is communicable with another piece of network equipment by wireless without connecting the network by cable wiring and also displaying the detected result on the network form drawing shown in FIG. 3 will be described along a flowchart of FIG. 31 by using the managed equipment data base 40 of FIG. 4, the service name data base 60 of FIG. 6, the process table 90 of FIG. 9, the traffic data base 100 of FIG. 10, and the wireless communication equipment data base 280 of FIG. 28.

Figure 31:
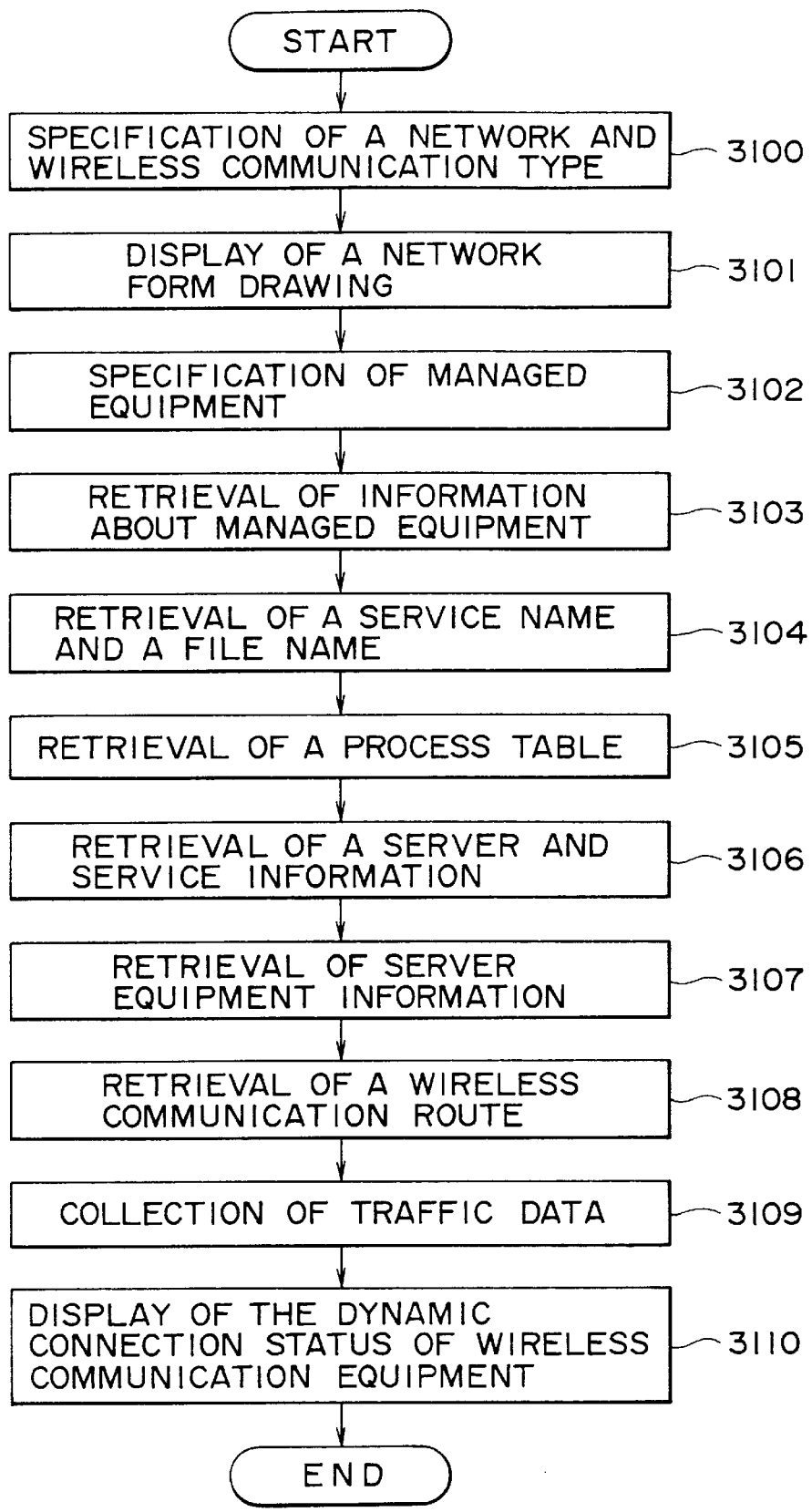
FIG. 31 is a flowchart showing the dynamic connection status of the wireless connection equipment.

In step 3100 of FIG. 31, dynamic connection status is detected by the user of the network management system, and a network and wireless communication type which are displayed are specified with the input unit.

In step 3101 the network management system displays the network form drawing of the specified network on the output unit.

In step 3102 the dynamic connection status is detected on the network form drawing by the user of the network management system, and wireless communicable managed equipment (client) which is displayed is specified with the input unit.

In step 3103 the network management system retrieves the information about the specified managed equipment from the managed equipment data base 40 of FIG. 4.

Furthermore, the wireless communication type and communicable equipment ID of the specified managed equipment are retrieved by using the wireless communication equipment data base 280 of FIG. 28.

In step 3104 the service name and the configuration file name, which are used under network environment by the managed equipment (as a client), are retrieved from the service name data bass 60 of FIG. 6 by using the managed equipment ID which is contained in the information about the managed equipment retrieved in step 3103. Note that the managed equipment where the partition has not been defined in the service name data base 60 will be handled as a client.

In step 3105, the process of the service name specified in step 3105 or the process of the service name specified in step 3106 is retrieved from the process table 90 shown in FIG. 9 which is held in the interior of the managed equipment (which becomes a client) by using the managed equipment ID which is contained in the information about the managed equipment retrieved in step 3103.

In step 3106, with the result in step 3105 where a service being executed by the managed equipment is retrieved from the process table, the configuration file is retrieved from the service name data base 60. The managed equipment ID and the machine name of the equipment which becomes the server of the service are retrieved. Furthermore, the access frequency is retrieved according to the kind of the service.

In step 3107, the information about the equipment which becomes a server and the corresponding geometrical figure on the network form drawing are retrieved from the managed equipment data base 40 of FIG. 4 by using the managed equipment ID and machine name of the equipment retrieved in step 3106 which becomes a server.

In step 3108, the information about the wireless communication route between both pieces of managed equipment is retrieved from the connection information stored in the managed equipment data base of the server retrieved in step 3107, the connection information about the managed equipment (client) specified in step 3102, and the wireless communication equipment data base 280 of FIG. 28.

In step 3109, the header portion of the packet, which is flowing through the network on the physical connection route retrieved in step 3108, is collected for a predetermined constant period of time and stored in the traffic data base 100 of FIG. 10 as traffic data.

In step 3110, the dynamic connection status of the managed equipment specified in step 3102 is displayed in recognizable form on the network form drawing displayed in step 3101 by using the kind of the service or the access frequency retrieved in step 3109, the geometrical figure of the server retrieved in step 3109, the information about the managed equipment constituting the wireless communication connection route retrieved in step 3110, and the traffic data collected in step 1811.

Figure 32:
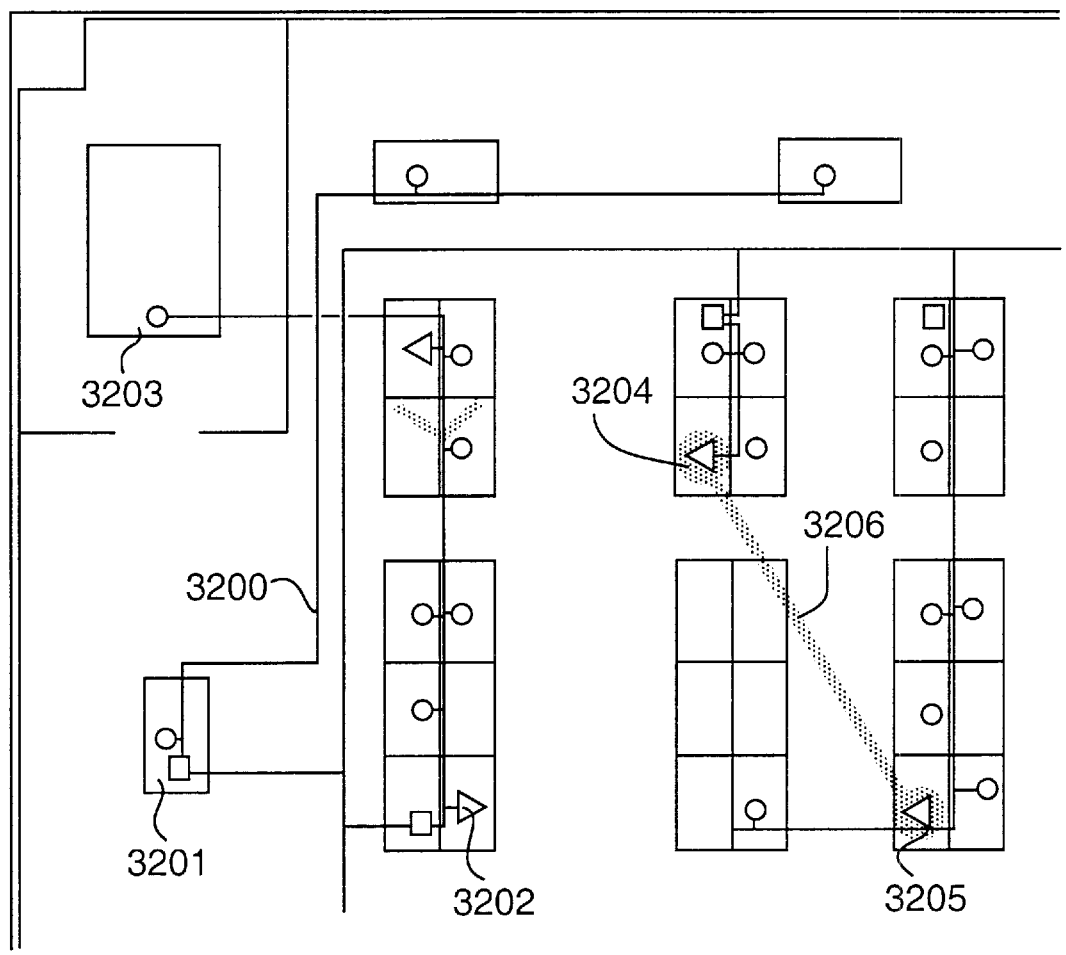
FIG. 32 is a diagram showing the dynamic connection status of the wireless connection equipment.

An example of the display form in step 3110 of a flowchart of FIG. 31 showing the dynamic connection status of the wireless connection equipment is shown in FIG. 32. Reference numeral 3200 of FIG. 32 represents a communication network, reference numeral 3201 network equipment, reference numeral 3202 an computer, and reference numeral 3203 a terminal. Reference numeral 3204 represents the managed equipment which is the client of certain service, specified in step 3102. Reference numeral 3205 represents the managed equipment which is the server of the service retrieved in step 3107. Reference numeral 3206 is the wireless communication route between both pieces of managed equipment, retrieved in step 3108.

The display of the dynamic connection status of the entire network is not limited to the form shown in FIG. 32 but the form of display can be changed by arbitrary changing display colors, line fonts, or display widths by the user. When a great number of clients that are accessed exist, it is possible to make the managed equipment 3205 larger which is a server or make the wireless communication route 3206 thicker. Also, when the display of the dynamic connection statuses regarding a plurality of services is performed, it is also possible to change a color of display in correspondence with the kind of the service.

In addition, by filtering a user name or extracting a process being executed by a user by using the information of the process table 90 of FIG. 9, it is also possible to display who the client on the network is and how the service of a network is being used.

Furthermore, the network management system, if either the managed equipment 3204 which is a client displayed as in FIG. 32 or the managed equipment 3205 which is a server is specified with the input unit by the user will display the detail, information about the dynamic connection status of the managed equipment.

If the specified managed equipment is a client, the managed equipment ID 400, classification 402, and machine name 404 of FIG. 4, the service name 601 and the protocol or demon 602 on the client side of FIG. 6, the retrieved result of the process table retrieved in step 3105 of the flowchart shown in FIG. 31, the managed equipment ID and machine name of the equipment which becomes the server retrieved in step 3106 of the flowchart shown in FIG. 31, and the access frequency corresponding to the kind of a service will be displayed as detail information.

When, on the other hand, the specified managed equipment is a server, the managed equipment ID 400, classification 402, and machine name 404 of FIG. 4, the service name 601 and the protocol or demon 602 on the server side of FIG. 6, and the server equipment information retrieved in step 3107 of the flowchart shown in FIG. 31 are displayed as detail information.

Furthermore, when the specified managed equipment is a physical connection route, the managed equipment ID 400, classification 402, and machine name 404 of FIG. 4, the service name 601 and the protocol or demon 602 on the server side of FIG. 6, and the server equipment information retrieved in step 3107 of the flowchart shown in FIG. 31 are displayed as detail information.

FIG. 33 shows the configuration of a fifth data base 330, in which the information about the logical and dynamic connection status of a global network and the information about managed equipment accessed by the global network are stored.

The logical and dynamic connection status of the global network is referred to as the status where the managed equipment within a network which is an object of management responds as a server on the request as a client for communication service from a machine within another network connected to the global network.

The managed equipment ID 3300 of FIG. 33, as with the data base 40 of FIG. 4, represents an identification number which can exclusively determine the managed equipment that is an object of management of the network management system. This managed equipment ID 3300 is allocated to the managed equipment's graphic data of the network form drawing that is displayed by the network management system.

Connecting medium 3301 is used for identifying the connection medium type which performs the physical connection between the managed equipment with the managed equipment ID and the global network.

Connecting method 3302, when communication is performed between the managed equipment and the global network by using the connecting medium 3301, shows in what procedure the communication is started.

Reference numeral 3303 denotes a service name which indicates what communication service the managed equipment 3300 provides through the global network with the connecting medium 3301 by the connecting method 3302.

Reference numeral 3304 denotes a client ID, which is the identification number of a client that is making a connection through the global network in order to receive the communication service 3303 supplied by the managed equipment having the managed equipment ID 3300.

The client ID 3304 is an identification number which can exclusively determine equipment performing communication in the global network. In the internet which is included in the global network, a 4-byte integer, called an IP address, is employed as a number which can exclusively determine this equipment. Connection start time 3305 indicates the year, month, day, and time the managed equipment 3300 communicated with the client 3304 with the content of connection of the service name 3303.

In the fifth data base 330 of FIG. 33, the managed equipment ID 3300, the connecting medium 3301, the connecting method 3302, and the service name 3303 have been previously set by the network manager. The client ID 3304 and the connection start time 3305 are buried in the information detected during the processing shown in a flowchart of FIG. 34 at the time that the logical and dynamic connection status of the global network is investigated.

Next, the process of detecting the logical and dynamic connection status of the managed equipment to the global network and displaying the detected result on the aforementioned display unit, together with the network form drawing, will be described along a flowchart of FIG. 34 by using the managed equipment data base 40 of FIG. 4, the service name data base 60 of FIG. 6, the process table 90 of FIG. 9, the traffic data base 100 of FIG. 10, and the fifth data base 330 of FIG. 33 where the information about the dynamic connection status is stored.

Figure 34:
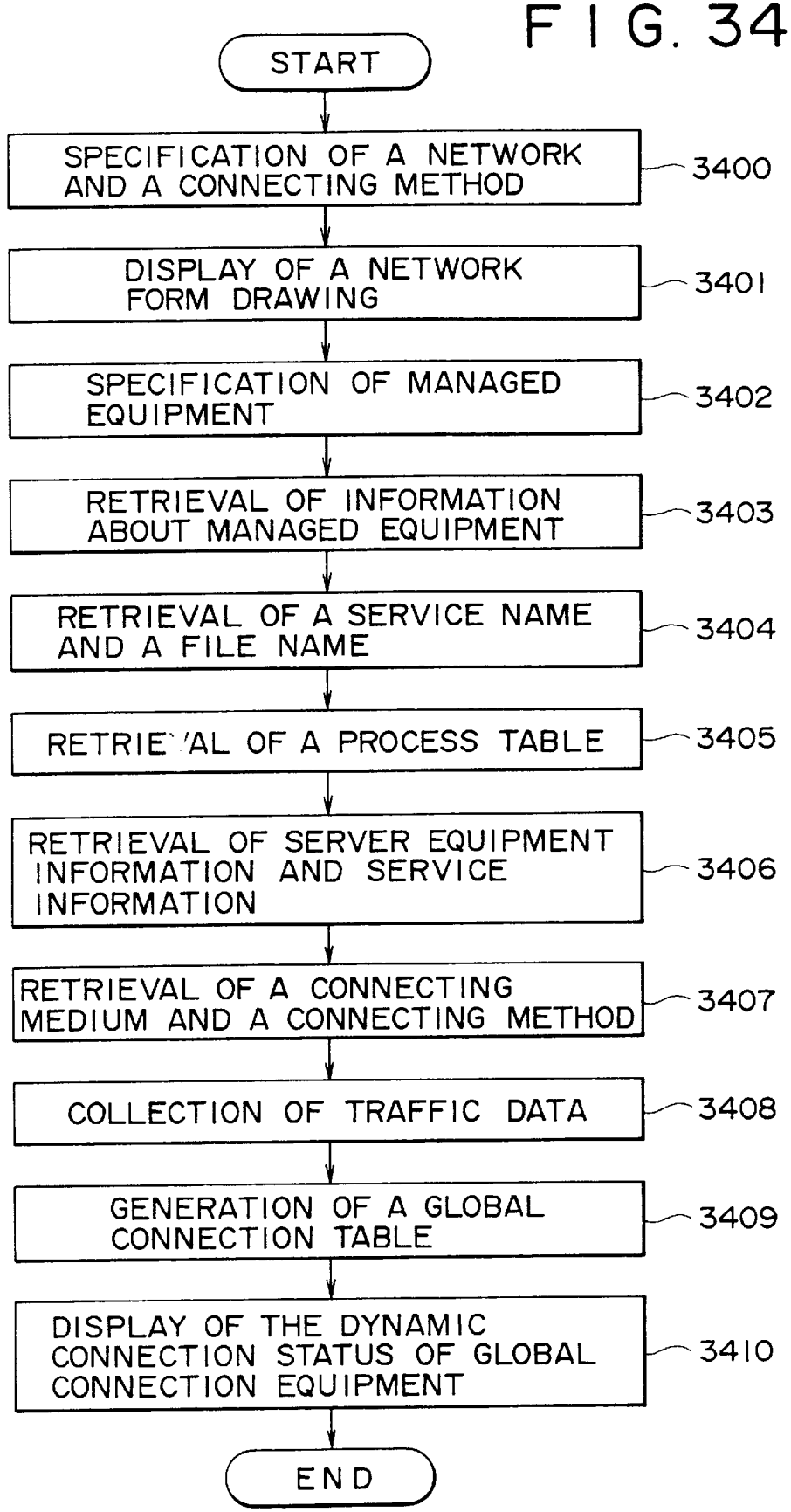
FIG. 34 is a flowchart showing the dynamic connection status of the global network.

In step 3400 of FIG. 34, a network which detects and displays dynamic connection status and the connecting method of the global network are specified with the input unit by the user of the network management system.

In step 3402 the managed equipment (server), which detects and displays dynamic connection status and provides communication service through the global network, is specified on the network form drawing with the input unit by the user of the network management system.

In step 3403 the network management system retrieves the information about the specified managed equipment specified in step 3402 from the managed equipment data base 40 of FIG. 4.

In step 3404 the service name and the configuration file name, which are used under network environment by the managed equipment (which is a server), are retrieved from the service name data base 60 of FIG. 6 by using the classification information which is contained in the information about the managed equipment retrieved in step 3403.

In step 3405 the process of the service name retrieved in step 3404 is retrieved from the process table 90 shown in FIG. 9 by using the managed equipment ID which is contained in the information about the managed equipment retrieved in step 3403.

In step 3406, with the result in step 3405 where a service being executed by the managed equipment is retrieved from the process table, the configuration file is retrieved from the service name data base 60. The service information of the service which is provided by the managed equipment and the corresponding geometrical figure on the network form drawing are also retrieved.

In step 3407 the connecting medium and connecting method by which the managed equipment specified in step 3402 is connectable with the global network are retrieved from the fifth data base 330 of FIG. 33.

In step 3408, the header portion of the packet, which is flowing on the global network connected by the connecting medium and connecting method retrieved in step 3407, is collected for a predetermined constant period of time and stored in the traffic data base 100 of FIG. 10 as traffic data.

In step 3409 the traffic data, collected in step 3408 and stored in the traffic data base 100 is extracted in correspondence with the service name 3303 of the fifth data base 330 of FIG. 33, and the client ID 3304 and the connection start time 3305 are buried. In this embodiment, the fifth data base 330 where the client ID 3304 and the connection start time 3305 are buried is referred to as a global connection table.

In step 3410, the dynamic connection status between the managed equipment specified in step 3402 and the global network is displayed in recognizable form on the network form drawing displayed in step 3401 by using the service name retrieved in step 3404, the geometrical figure of the server retrieved in step 3406, and the global connection table generated in step 3409.

Figure 35:
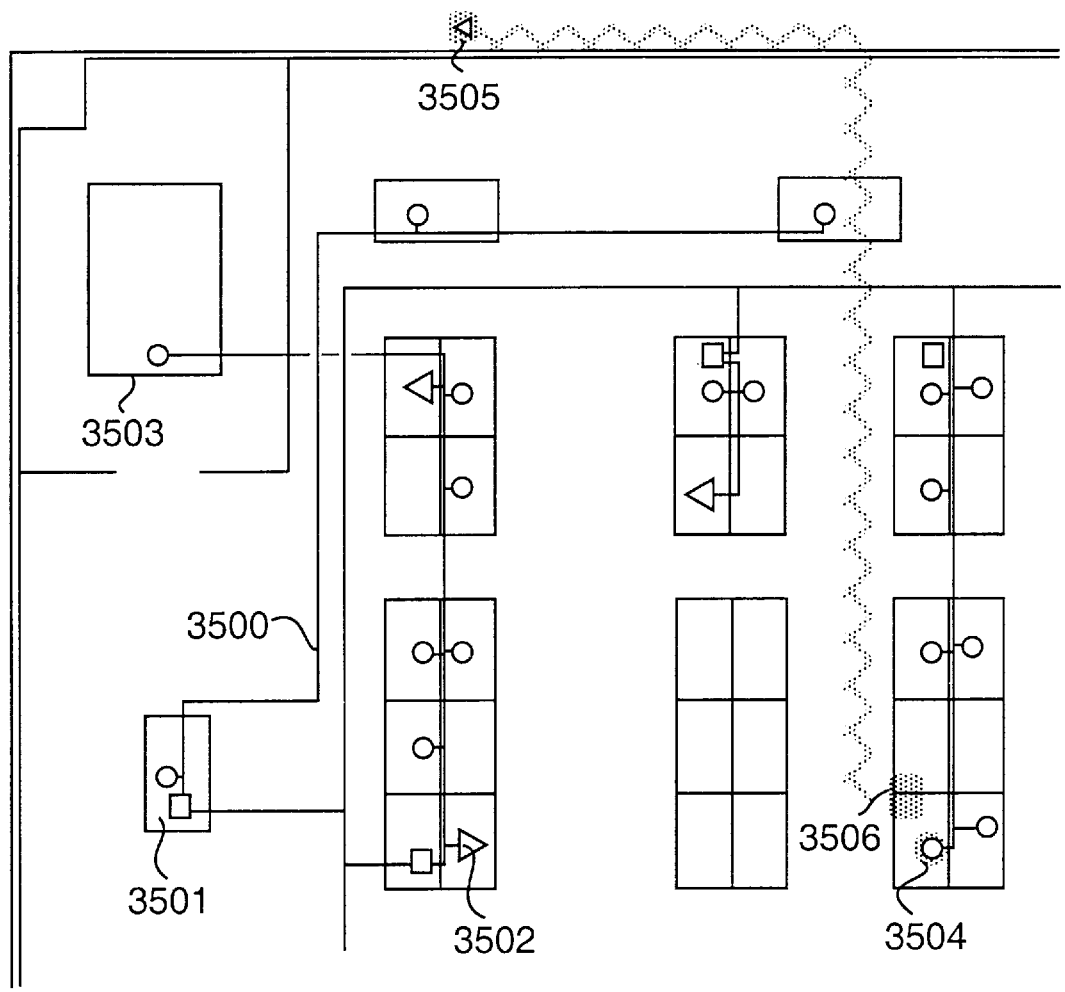
FIG. 35 is a diagram showing the dynamic connection status of the global network.

An example of the display form in step 3410 of a flowchart of FIG. 34 showing the dynamic connection status between the managed equipment and the global network is shown in FIG. 35.

Reference numeral 3500 of FIG. 35 represents a communication network, reference numeral 3501 network equipment, reference numeral 3502 an computer, and reference numeral 3503 a terminal. Reference numeral 3504 represents the managed equipment (server) which supplies service to the global network specified in step 3402. Reference numeral 3505 represents the virtual geometrical figure of the equipment which has the client ID buried in the global connection table generated in step 3407. Reference numeral

3506 represents the connecting medium between both pieces of managed equipment, retrieved in step 3407.

In order to display the dynamic connection status between the managed equipment and the global network, there is the need for expressing on the network form drawing the existence of the client equipment connected to an external network other than the object of management of the network management system in 3505 of FIG. 34, the managed equipment with the client ID is expressed by a geometrical figure similar to the computer 3502 and the terminal 3503, however, special virtual geometrical figures may be set and displayed in order to clearly distinguish them from other pieces of managed equipment which are objects of management of the network management system.

The display of the dynamic connection status of the entire network is not limited to the form shown in FIG. 32 but the form of display can be changed by arbitrary changing display colors, line fonts, or display widths by the user. When a great number of clients that are accessed exist, it is possible to make the managed equipment 3504 (server) larger or make the wireless communication route 3506 thicker. In addition, when the display of the dynamic connection statuses regarding a plurality of services is performed, it is also possible to change a color of display in correspondence with the kind of the service.

Furthermore, the network management system, if the managed equipment 3504 which is a server displayed as in FIG. 35 is specified with the input unit by the user, will display the detail information about the dynamic connection status of the managed equipment.

In the aforementioned case, the managed equipment ID 400, classification 402, and machine name 404 of FIG. 4, the server equipment information and service information retrieved in step 3406 of the flowchart of FIG. 34, and the connecting medium 3301, connecting method 3302, server equipment information, service name 3303, client ID 3304, and connection start time 3305 of the global connection table (the fifth data base of FIG. 33) generated in step 3409 of the flowchart of FIG. 34 will be displayed as detail information.

Therefore, as has been described, the information about the logical and dynamic connection status of the network equipment on the network is displayed on the network form drawing. Therefore, the dynamic dependent relation at a certain point of time between pieces of network equipment, the direction of dependence, and the degree or frequency of dependence can be visually grasped.

Furthermore, according to the aforementioned means, a plurality of pieces of information about the logical and dynamic connection status of the network equipment on the network are integrated, and the degree of importance of each piece of network equipment to the network at a certain point of time and the mutual dependent status between pieces of network equipment are displayed on the network form drawing. Therefore, the operational status or load concentration tendency of the entire network which is an object of management can be grasped. Moreover, indexes for taking a measurement to disperse load on the network and to make traffic uniform can be indicated.

While the present invention has been described with relation to the preferred embodiments, the invention is not to be limited to the details given herein. Various modifications and adaptations of the present invention will now be apparent to those skilled in the art. All such modifications and adaptations as fall within the scope of the appended claims are intended to be covered thereby.

As has been described hereinbefore, the present invention has the following advantageous effects (1) through (6)

(1) Since the information about the logical and static connection relation of the network equipment on the network is displayed on the network form drawing, the static dependent relation between pieces of network equipment and the direction of dependence can be visually grasped. In addition, the setting of the degree or frequency of dependence can be visually grasped.

(2) Also, since a plurality of pieces of information about the logical and static connection relation of the network equipment on the network are integrated and the degree of importance of each piece of network equipment to the network is displayed on the network form drawing, the critical point of a network which is an object of management can be grasped and traffic tendency can be predicted.

(3) in addition, because the information about the logical and dynamic connection status of the network equipment on the network is displayed on the network form drawing, the dynamic dependent relation at a certain point of time between pieces of network equipment and the direction of dependence can be visually grasped. The degree or frequency of dependence can also be visually grasped.

(4) Furthermore, a plurality of pieces of information about the logical and dynamic connection status of the network equipment on the network are integrated, and the degree of importance of each piece of network equipment to the network at a certain point of time and the mutual dependent status between pieces of equipment are displayed on the network form drawing. Therefore, the operational status or load concentration tendency of the entire network which is an object of management can be grasped. In addition, indexes for taking a measurement to disperse load on the network and to make traffic uniform can be indicated (5) Moreover, because the static dependent relation between pieces of equipment performing wireless communication using infrared rays or radio waves and the dynamic dependent status at a certain point of time are displayed on the network form drawing, the direction or degree of dependence can be visually grasped. Thus, the network of the wireless communication type can be managed in the same way as the network using cable wiring.

(6) Finally, it is displayed on the network form drawing whether at a certain point of time the managed equipment within a network which is an object of management is responding as a server on the request for communication service from a machine connected to another global network other than an object of management. Therefore, the dynamic dependence status at a certain point of time can be grasped between pieces of managed equipment in a network which is outside an object of management and a network which is an object of management.

What is claimed is:

1. A network management system for managing and operating a network in which a plurality of pieces of network equipment including computers are interconnected, the network management system comprising:

a first data base containing information about a physical disposition of said network equipment;

a second data base containing information about a logical and static connection relation of said network equipment, said information including a file name of a start file which is executed when each piece of equipment managed by the network management system is started, various kinds of pieces of network service start information described in the respective start files, and set information described in configuration files about each network service;

a display unit for displaying various kinds of pieces of information about the network and a network form drawing; and first processing means for displaying, on said display unit, a static dependent relation between pieces of network equipment and strength of dependence in said computer network, together with said network form drawing, based on the information stored in said first and second data bases.

2. The network management system as set forth in claim 1, wherein said first processing means includes means which, when an indication operation to a position of network equipment on said network form drawing displayed on said display unit is performed, extracts initial access through the network to another piece of network equipment connected to said network which is performed at the time of the start of the network equipment where said indication operation was performed, by using the information about the physical disposition stored in said first data base and the information about the logical and static connection relation stored in said second data base; and means which displays, on said display unit, detail information, including permission to access a network resource, occupation, start of an application, data transfer, existence of a network neighborhood, degree of the network neighborhood, and situation of data transfer, as between a plurality of said pieces of network equipment, about the strength of the connection relation, the direction of the access, and the content of the access on a network corresponding to the kind of the extracted access.

3. The network management system as set forth in claim 1, wherein said first processing means includes means which, when an indication operation to a position of network equipment on said network form drawing displayed on said display unit is performed, extracts initial access through a network which is executed from another piece of network equipment connected to said network at the time of the start of the network equipment where said indication operation was performed, by using the information about the physical disposition stored in said first data base and one of permission to access a network resource, occupation, start of an application, data transfer, existence of a network neighborhood, degree of the network neighborhood, and situation of data transfer, as between a plurality of said pieces of network equipment, about the logical and static connection relation stored in said second data base; and means which displays, on said display unit, detail information about the strength of the connection relation, the direction of the access, and the content of the access on a network corresponding to the kind of the extracted access.

4. The network management system as set forth in claim 1, wherein said first processing means is provided with means which generalizes a plurality of pieces of information about the logical and static connection relations of all pieces of network equipment on said network form drawing displayed on said display unit, and displays on said display unit a mutual dependent relation between pieces of network equipment on the network and a degree of importance of each piece of network equipment to the network, changing the display form in proportion to said degree of importance.

5. The network management system as set forth in claim 1, further comprising:

a third data base where information about a logical and dynamic connection status of said network equipment is stored; and second processing means for detecting whether the connected equipment requests for connection to another piece of the network equipment, displaying on said display unit the physical disposition of said network equipment and the logical and dynamic connection status of said network equipment if detected, together with said network form drawing, based on the information stored in said first and third data bases.

6. The network management system as set forth in claim 5, wherein said second processing means includes means which, when an indication operation to a position of network equipment on said network form drawing displayed on said display unit is performed, extracts access to another piece of network equipment connected to said network at that time with respect to the network equipment where said indication operation was performed, by using the information about the physical disposition stored in said first data base and the information about the logical and dynamic connection status stored in said third data base; and means which displays, on said display unit, detail information, including permission to access a network resource, occupation, start of an application, data transfer, existence of a network neighborhood, degree of the network neighborhood, and situation of data transfer, as between a plurality of said pieces of network equipment, about the strength of the connection relation, the direction of the access, and the content of the access on a network corresponding to the kind of the extracted access.

7. The network management system as set forth in claim 5, wherein said second processing means includes means which, when an indication operation to a position of network equipment on said network form drawing displayed on said display unit is performed, extracts access from another piece of network equipment connected to said network at that time with respect to the network equipment where said indication operation was performed, by using the information about the physical disposition stored in said first data base and one of permission to access a network resource, occupation, start of an application, data transfer, existence of a network neighborhood, degree of the network neighborhood, and situation of data transfer, as between a plurality of pieces of network equipment, about the logical and dynamic connection status stored in said third data base; and means which displays, on said display unit, detail information about the strength of the connection relation, the direction of the access, and the content of the access on a network corresponding to the kind of the extracted access.

8. The network management system as set forth in claim 5, wherein said second processing means is provided with means which generalizes a plurality of pieces of information about the logical and static connection relations of all pieces of network equipment on said network form drawing displayed on said display unit, and displays on said display unit a mutual dependent relation between pieces of network equipment on the network and a degree of importance of each piece of network equipment to the network, changing display form in proportion to said degree of importance.

* * * * *

UNITED STATES PATENT AND TRADEMARK OFFICE
CERTIFICATE OF CORRECTION

PATENT NO. : 5,841,981  
DATED : November 24, 1998  
INVENTOR(S) : M. Kondo

Page 1 of 5

It is certified that error appears in the above-identified patent and that said Letters Patent is hereby corrected as shown below:

Column 9, line 36, change "an" to --a--.

Column 10, line 1, change "where" to --containing--.

Column 11, line 7, after "901" insert --represents--;
    line 10, after "904" insert --represents--;
    line 42, after "1003" insert --a--;
    line 43, after "1004" insert --a--; and
    line 67, before "floor" insert --the--.

Column 12, line 15, after "of" insert --a--;
    line 47, change "under" to --in the--; and
    line 67, change "under" to --in the--.

Column 13, line 2, after "started" insert --,--; and
    line 49, change "an" to --a--.

Column 14, line 12, change "an" to --a--;
    line 42, change "arbitrary" to --arbitrarily--;
    line 53, after "of" insert --a--; and
    line 61, change "under" to --in the--.

Column 15, line 46, change "under" to --in the--.

Column 16, line 37, change "1411" to --1413--;
    line 43, change "an" to --a--; and
    line 48, delete "the".

UNITED STATES PATENT AND TRADEMARK OFFICE
CERTIFICATE OF CORRECTION

PATENT NO. : 5,841,981
DATED : November 24, 1998
INVENTOR(S) : M. Kondo

It is certified that error appears in the above-identified patent and that said Letters Patent is hereby corrected as shown below:

Column 17, line 1, change "arbitrary" to --arbitrarily--;
    line 5, after "make" insert --larger--;
    line 6, delete "larger" and after "make" insert --thicker--;
    line 7, delete "thicker";
    line 49, after "retrieve" insert --a--; and
    line 57, change "sever" to --server--.

Column 18, line 9, change "1407" to --1607--;
    line 17, change "1408" to --1608--; and
    line 37, change "an" to --a--.

Column 20, line 53, change "an" to --a--;
    line 54, delete "and"; and
    line 64, change "arbitrary" to --arbitrarily--.

Column 21, line 15, change "either" to --any of--;
    line 17, change "22 or" to --22,-- and after "server" insert --,--;
    line 58, change "under" to --in a--.

Column 22, line 47, change "under" to --in the--;
    line 55, change "under" to --in the--; and
    line 58, change "formation" to --information--.

Column 23, line 46, change "an" to --a--;
    line 57, change "arbitrary" to --arbitrarily--;
    line 62, after "make" insert --larger--;
    line 63, delete "larger" and after "make" insert --thicker--; and
    line 64, delete "thicker".

UNITED STATES PATENT AND TRADEMARK OFFICE
CERTIFICATE OF CORRECTION

PATENT NO. : 5,841,981  
DATED : November 24, 1998  
INVENTOR(S) : M. Kondo

Page 3 of 5

It is certified that error appears in the above-identified patent and that said Letters Patent is hereby corrected as shown below:

Column 24, line 6, change "whom" to --who--;
    line 9, change "either" to --any of--;
    line 11, change "25 or" to --25,-- and after "client" insert --,--; and
    line 66, change "in" to --referring to--.

Column 25, line 8, change "in" to --referring to--;
    line 10, change "sever" to --server--; and
    line 63, change "an" to --a--.

Column 26, line 7, change "arbitrary" to --arbitrarily--;
    line 12, after "make" insert --larger--;
    line 13, delete "larger" and after "make" insert --thicker--;
    line 14, delete "thicker";
    line 24, change "either" to --any of--;
    line 26, change "27 or" to --27,-- and after "client" insert --,--;
    line 51, change "light or" to --electromagnetic waves, such as light waves,-- and change "such as infrared rays, microwaves, or" to --infrared rays, or microwaves--;
    line 52, delete "electro-magnetic waves";
    line 59, change "is communicable by wireless" to --can communicate without wires--; and
    line 64, delete "which is communicable"; and
    line 65, delete "by wireless".

Column 27, line 41, change "under" to --in a--.

Column 28, line 9, change "an" to --a--;
    line 32, after "of" (second occurrence) insert --a--;
    line 52, change "arbitrary" to --arbitrarily--;

UNITED STATES PATENT AND TRADEMARK OFFICE
CERTIFICATE OF CORRECTION

PATENT NO. : 5,841,981
DATED : November 24, 1998
INVENTOR(S) : M. Kondo

It is certified that error appears in the above-identified patent and that said Letters Patent is hereby corrected as shown below:

Column 28 continued:
    line 55, after "make" insert --larger-- and delete "larger"; and
    line 56, after "make" insert --thicker-- and delete "thicker".

Column 29, line 26, change "under" to --in the--.

Column 30, line 13, change "an" to --a--;
    line 15, after "of" insert --a--;
    line 23, change "arbitrary" to --arbitrarily--;
    line 26, after "make" insert --larger-- and delete "larger"; and
    line 27, after "make" insert --thicker-- and delete "thicker".

Column 32, line 61, change "an" insert --a--.

Column 33, line 8, change "system in" to --system. In step--;
    line 17, change "arbitrary" to --arbitrarily--; and
    line 42, change "Therefore, as" to --As--.

UNITED STATES PATENT AND TRADEMARK OFFICE
CERTIFICATE OF CORRECTION

PATENT NO. : 5,841,981
DATED      : NOVEMBER 24, 1998
INVENTOR(S) : M. Kondo

It is certified that error appears in the above-identified patent and that said Letters Patent is hereby corrected as shown below:

IN THE ABSTRACT

Line 4, change "." to --,--; and
    Line 5, delete "The network management system".

Signed and Sealed this

Twenty-seventh Day of April, 1999

Attest:

Q. TODD DICKINSON

*Attesting Officer*      *Acting Commissioner of Patents and Trademarks*